United States Patent
Siegel et al.

(10) Patent No.: US 10,122,992 B2
(45) Date of Patent: Nov. 6, 2018

(54) PARALLAX BASED MONOSCOPIC RENDERING

(71) Applicant: Disney Enterprises, Inc., Burbank, CA (US)

(72) Inventors: Lewis Nathaniel Siegel, Burbank, CA (US); Brandon Bloch, Venice, CA (US); Robert M. Neuman, Canyon Country, CA (US); Brian Whited, Glendale, CA (US); David Anthony Bossert, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 602 days.

(21) Appl. No.: 14/285,240

(22) Filed: May 22, 2014

(65) Prior Publication Data
US 2015/0341616 A1    Nov. 26, 2015

(51) Int. Cl.
| | |
|---|---|
| H04N 13/00 | (2018.01) |
| H04N 13/261 | (2018.01) |
| H04N 13/02 | (2006.01) |
| H04N 13/111 | (2018.01) |
| H04N 13/128 | (2018.01) |
| H04N 13/366 | (2018.01) |
| H04N 13/04 | (2006.01) |

(52) U.S. Cl.
CPC ....... *H04N 13/261* (2018.05); *H04N 13/0011* (2013.01); *H04N 13/0022* (2013.01); *H04N 13/026* (2013.01); *H04N 13/0468* (2013.01); *H04N 13/111* (2018.05); *H04N 13/128* (2018.05); *H04N 13/366* (2018.05)

(58) Field of Classification Search
CPC .................................................... H04N 12/026
USPC ....................................... 348/42–60; 345/419
See application file for complete search history.

(56) References Cited

U.S. PATENT DOCUMENTS

| | | | |
|---|---|---|---|
| 4,925,294 A | | 5/1990 | Geshwind et al. |
| 5,499,323 A | | 3/1996 | Doi et al. |
| (Continued) | | | |

FOREIGN PATENT DOCUMENTS

| | | | | |
|---|---|---|---|---|
| GB | 2470754 A | * | 12/2010 | ............. A63F 13/10 |
| JP | 2009212728 A | * | 9/2009 | |
| | (Continued) | | | |

OTHER PUBLICATIONS

Engle, Rob, "Beowulf 3D: a case study", Pros. SPIE 6803, Stereoscopic Displays and Application XIX, 68030R (Feb. 29, 2008).
(Continued)

*Primary Examiner* — Dave Czekaj
*Assistant Examiner* — Shanika Brumfield
(74) *Attorney, Agent, or Firm* — Dorsey & Whitney LLP

(57) ABSTRACT

A method for creating multiple viewpoint images for an image frame. The method includes receiving by a processing element a left eye image and a right eye image, wherein the left eye image and right eye image comprise a stereoscopic image pair. Once the images are received, the method includes determining by the processing element a first viewing location corresponding to the left eye image and a second viewing location corresponding to the right eye image and determining by the processing element a plurality of new viewpoint locations using the first viewing location and the second viewpoint location.

6 Claims, 28 Drawing Sheets

(56) References Cited

U.S. PATENT DOCUMENTS

| | | | |
|---|---|---|---|
| 5,510,832 | A | 4/1996 | Garcia |
| 5,537,528 | A | 7/1996 | Takahashi et al. |
| 6,208,348 | B1 | 3/2001 | Kaye |
| 6,515,659 | B1 | 2/2003 | Kaye |
| 6,590,573 | B1 | 7/2003 | Geshwind |
| 6,664,961 | B2 | 12/2003 | Ray et al. |
| 6,686,926 | B1 | 2/2004 | Kaye |
| 7,082,223 | B1 | 7/2006 | Harris |
| 7,102,633 | B2 | 9/2006 | Kaye |
| 7,116,323 | B2 | 10/2006 | Kaye |
| 7,116,324 | B2 | 10/2006 | Kaye |
| 7,254,265 | B2 | 8/2007 | Naske et al. |
| 7,256,779 | B2 | 8/2007 | Donnelly |
| 7,551,770 | B2 | 6/2009 | Harman |
| 7,573,475 | B2 * | 8/2009 | Sullivan ............. H04N 13/0275 345/419 |
| 7,639,838 | B2 | 12/2009 | Nims |
| 7,925,078 | B2 | 4/2011 | Rhodes |
| 8,194,073 | B2 * | 6/2012 | Tokita ..................... A63F 13/06 345/419 |
| 8,351,689 | B2 | 1/2013 | Turner et al. |
| 8,411,931 | B2 | 4/2013 | Zhou et al. |
| 8,502,862 | B2 * | 8/2013 | Turner .................... G06T 13/20 348/46 |
| 9,294,757 | B1 * | 3/2016 | Lewis ................. H04N 13/0242 |
| 9,342,861 | B2 * | 5/2016 | Izumi ................... H04N 13/026 |
| 2002/0118275 | A1 | 8/2002 | Harman |
| 2002/0186216 | A1 | 12/2002 | Baumberg et al. |
| 2003/0007681 | A1 | 1/2003 | Baker |
| 2004/0015424 | A1 | 1/2004 | Cash et al. |
| 2004/0135780 | A1 | 7/2004 | Nims |
| 2004/0222988 | A1 | 11/2004 | Donnelly |
| 2005/0254702 | A1 | 11/2005 | Era |
| 2005/0271303 | A1 | 12/2005 | Simpson |
| 2006/0026527 | A1 | 2/2006 | Bells |
| 2006/0184279 | A1 | 8/2006 | Okamoto et al. |
| 2007/0279415 | A1 | 12/2007 | Sullivan et al. |
| 2008/0247670 | A1 | 10/2008 | Tam et al. |
| 2009/0195643 | A1 | 8/2009 | Neuman |
| 2009/0196492 | A1 | 8/2009 | Jung et al. |
| 2009/0219283 | A1 | 9/2009 | Hendrickson et al. |
| 2009/0219383 | A1 | 9/2009 | Passmore |
| 2009/0262184 | A1 | 10/2009 | Engle et al. |
| 2009/0322860 | A1 | 12/2009 | Zhang et al. |
| 2010/0073364 | A1 | 3/2010 | Jung et al. |
| 2010/0080448 | A1 | 4/2010 | Tam et al. |
| 2010/0265248 | A1 | 10/2010 | McCrae et al. |
| 2011/0050687 | A1 | 3/2011 | Alyshev et al. |
| 2011/0050864 | A1 | 3/2011 | Bond |
| 2011/0074778 | A1 | 3/2011 | Turner et al. |
| 2011/0074784 | A1 | 3/2011 | Turner et al. |
| 2011/0130949 | A1 * | 6/2011 | Arrasvuori ......... G01C 21/3638 701/532 |
| 2011/0169928 | A1 * | 7/2011 | Gassel ................. H04N 13/044 348/53 |
| 2011/0210969 | A1 | 9/2011 | Barenbrug |
| 2011/0304691 | A1 | 12/2011 | Newton et al. |
| 2012/0099836 | A1 | 4/2012 | Welsh et al. |
| 2012/0321171 | A1 * | 12/2012 | Ito ...................... H04N 13/0011 382/154 |
| 2013/0050412 | A1 * | 2/2013 | Shinohara .......... H04N 13/0022 348/42 |
| 2013/0249904 | A1 * | 9/2013 | Kobayashi ......... H04N 13/0014 345/419 |

FOREIGN PATENT DOCUMENTS

| | | | | |
|---|---|---|---|---|
| JP | 2011188142 A | * | 9/2011 | ......... H04N 13/0011 |
| WO | WO 9843442 A1 | * | 10/1998 | ............ G06T 15/10 |
| WO | 2004021151 A2 | | 3/2004 | |
| WO | 2008060289 A1 | | 5/2008 | |

OTHER PUBLICATIONS

Battiato, et al., "3D stereoscopic image pairs by depth-map generation", Proceedings of the 2nd International Symposium on 3D Data Processing, Visualization, and Transmission (3DPVT'04), IEEE, 2004, 8 pages.

Brimelow, "New tutorial on parallax 3D effects", http://www.leebrimelow.com/new-tutorial-on-parallax-3d-effects/. Published on Dec. 5, 2008, 9 pages.

European Search Report, EP 10179710.8; "Method and System for Creating Depth and Volume in a 2-D Planar Image," 7 pages.

Johnston, "Lumo: Illumination for Cel Animation", Proceedings of the 2nd International Symposium on Non-Photorealistic Animation and Rendering, Annecy, France, 2002, pp. 45-52 and 156.

Petrovic, et al., "Shadows for Cel Animation", Proceedings of SIGGRAPH2000, ACM Press / ACM SIGGRAPH, Computer Graphics Proceedings, Annual Conference Series, ACM 2000, pp. 511-516.

U.S. Final Office Action dated May 24, 2012 for U.S. Appl. No. 12/571,412, filed Sep. 30, 2009, 50 pages.

Tam, et al., "3D-TV Content Generation: 2D-to-3D Conversion", 2006 IEEE International Conference on Multimedia and Expo (Jul. 12, 2006), 1869-1872.

U.S. Appl. No. 12/571,406, filed Sep. 30, 2009.
U.S. Appl. No. 12/571,412, filed Sep. 30, 2009.
U.S. Appl. No. 12/650,687, filed Dec. 31, 2009.
U.S. Appl. No. 12/650,800, filed Dec. 31, 2009.
U.S. Appl. No. 12/571,407, filed Sep. 30, 2009.
U.S. Appl. No. 13/959,833, filed Aug. 6, 2013.
U.S. Appl. No. 14/719,118, filed May 21, 2015.
U.S. Non-Final Office Action dated Apr. 4, 2012, U.S. Appl. No. 12/571,418, filed Sep. 30, 2009, 8 pages.

* cited by examiner

PARALLAX BASED MONOSCOPIC RENDERING

CROSS REFERENCE TO RELATED APPLICATIONS

This application is a related to U.S. patent application Ser. No. 12/571,412 entitled "Gradient Modeling Toolkit for Sculpting Stereoscopic Depth Models for Converting 2-D Images Into Stereoscopic 3-D Images," filed Sep. 30, 2009 and incorporated by reference in its entirety herein.

FIELD OF THE INVENTION

Aspects of the present invention relate to conversion of two dimensional (2-D) multimedia content to stereoscopic three dimensional (3-D) multimedia content. More particularly, aspects of the present invention involve a gradient modeling toolkit for sculpting stereoscopic gradient models for a 2-D image for purposes of applying a stereoscopic 3-D effect to one or objects of the 2-D image.

BACKGROUND

Three dimensional (3-D) imaging, or stereoscopy, is a technique used to create the illusion of depth in an image. In many cases, the stereoscopic effect of an image is created by providing a slightly different perspective of a particular image to each eye of a viewer. The slightly different left eye image and right eye image may present two perspectives of the same object, where the perspectives differ from each other in a manner similar to the perspectives that the viewer's eyes may naturally experience when directly viewing a three dimensional scene. For example, in a frame of a stereoscopic 3-D film or video, a corresponding left eye frame intended for the viewer's left eye may be filmed from a slightly different angle (representing a first perspective of the object) from the corresponding right eye frame intended for the viewer's right eye (representing a second perspective of the object). When the two frames are viewed simultaneously or nearly simultaneously, the pixel offset between the left eye frame and the right eye frame provides a perceived depth to the objects in the frames, thereby presenting the combined frames in what appears as three dimensions.

In creating stereoscopic 3-D animation from 2-D animation, one approach to construct the left eye and right eye images necessary for a stereoscopic 3-D effect is to first create a virtual 3-D environment consisting of a computer-based virtual model of the 2-D image, which may or may not include unique virtual models of specific objects in the image. These objects are positioned and animated in the virtual 3-D environment to match the position of the object(s) in the 2-D image when viewed through a virtual camera. For stereoscopic rendering, two virtual cameras are positioned with an offset between them (inter-axial) to simulate the left eye and right eye views of the viewer. Once positioned, the color information from each object in the original image is "cut out" (if necessary) and projected from a virtual projecting camera onto the virtual model of that object. This process is commonly referred to as projection mapping. The color information, when projected in this manner, presents itself along the front (camera facing) side of the object and also wraps around some portion of the front sides of the object. Specifically, any pixel position where the virtual model is visible to the projection camera will display a color that matches the color of the projected 2-D image at that pixel location. Depending on the algorithm used, there may be some stretching or streaking of the pixel color as a virtual model bends toward or away from the camera at extreme angles from perpendicular, but this is generally not perceived by a virtual camera positioned with sufficiently small offset to either side of the projecting camera.

Using this projection-mapped model in the virtual 3-D environment, the left eye and right eye virtual cameras will capture different perspectives of particular objects (representing the left eye and the right eye views) that can be rendered to generate left eye and right eye images for stereoscopic viewing. However, this technique to convert a 2-D image to a stereoscopic 3-D image has several drawbacks. First, creating a virtual 3-D environment with virtual models and cameras is a labor-intensive task requiring computer graphics software and artistic and/or technical talent specialized in the field of 3-D computer graphics. Second, with animated objects, the virtual model must alter over time (frame by frame) to match the movement and deformation of the object in the 2-D image. For the best results, the alteration of the model precisely matches the movement of the object(s) frame by frame. Camera movement may also be taken into account. This is a time consuming task requiring advanced tracking and significant manual labor. In addition, this requires that the 2-D image be recreated almost entirely in a virtual 3-D environment, which also requires significant manual labor, as it implies effectively recreating the entire movie with 3-D objects, backgrounds and cameras.

SUMMARY

A first embodiment of the present disclosure may take the form of a method for generating a stereoscopic image from a two dimensional image. The method may comprise the operations of obtaining a first two dimensional digital image comprising a first plurality of pixel values and obtaining a first gradient model comprising a first plurality of depth attributes. The method may also include the operations of obtaining a first two dimensional digital image comprising a second plurality of pixel values corresponding to the first plurality of pixel values and applying the first gradient model to the second plurality of pixel values to horizontally offset one or more of the second plurality of pixel values relative to the first plurality of pixel values based upon the depth attributes of the first gradient model.

A second embodiment of the present disclosure may take the form of a method for generating a stereoscopic frame. The method may comprise the operations of extracting a layer from a two dimensional frame, wherein the layer comprises a first portion and a second portion of the two dimensional frame and obtaining a gradient model comprising a gray scale template having a plurality of gray scale values relative to each of the first portion and second portion. The method may also include the operations of altering the shape of the gradient model to approximate a portion of the two dimensional frame and generating a duplicate layer comprising a duplicate of the first image portion and a duplicate of the second image portion. The method may further include horizontally offsetting the first image portion relative to the duplicate of the first image portion a first amount based on a portion of the plurality of gray scale values and the second image portion relative to the duplicate of the second image a second amount, different from the first amount, based on a portion of the plurality of gray scale values. Further, the layer and the duplicate of the layer are displayed substantially contemporaneously for stereoscopic viewing of the image.

A third embodiment of the present disclosure may take the form of a system for generating stereoscopic images from a two dimensional planar image. The system may comprise one or more computing devices coupled with a storage medium storing one or more two dimensional frames. The storage medium may further include a plurality of digital geometric shape models, with each given geometric shape model representing depth as a gray scale value and representative of one or more basic geometric shapes. The one or more computing devices may be further configured to perform the operations of retrieving a two dimensional digital image comprising a first plurality of pixel values and selecting a first gradient model from the plurality of digital geometric shape models. The first gradient model may comprise a gray scale template having a plurality of gray scale values relative to each of the first plurality of pixel values. The computing device may be further configured to perform the operations of obtaining a copy of the two dimensional image comprising a second plurality of pixel values corresponding to the first plurality of pixel values and horizontally displacing one or more of the second plurality of pixel values based upon the plurality of gray scale values for the first plurality of pixel values.

A fourth embodiment of the present disclosure may include a method for creating multiple viewpoint images for an image frame. The method includes receiving by a processing element a left eye image and a right eye image, wherein the left eye image and right eye image comprise a stereoscopic image pair. Once the images are received, the method includes determining by a processing element a first viewing location corresponding to the left eye image and a second viewing location corresponding to the right eye image and determining by the processing element a plurality of new viewpoint locations using the first viewing location and the second viewpoint location.

A fifth embodiment of the present disclosure may include a method for displaying content on a two-dimensional display for a three-dimensional effect. The method includes displaying on the two-dimensional display a first image having a first viewpoint corresponding to a first frame of the content, detecting by a sensor a user input, analyzing by a processing element the user input, wherein when the user input is a first value continuing to display the first image and when the user input is a second value selectively displaying by the two dimensional display a second image having a second viewpoint corresponding to the first frame of the content.

A sixth embodiment of the present disclosure may include a computing device. The computing device may include a screen for displaying a visual output, at least one sensor for detecting a first user input to the computing device, and a processing element in communication with the screen and the at least one sensor. In response to the first user input the processing element selectively transmits a viewpoint image from a plurality of viewpoint images to the screen, the screen displays the image, and the plurality of viewpoint images correspond to images of a first frame from a plurality of viewpoint locations.

OVERVIEW

Figure 1:
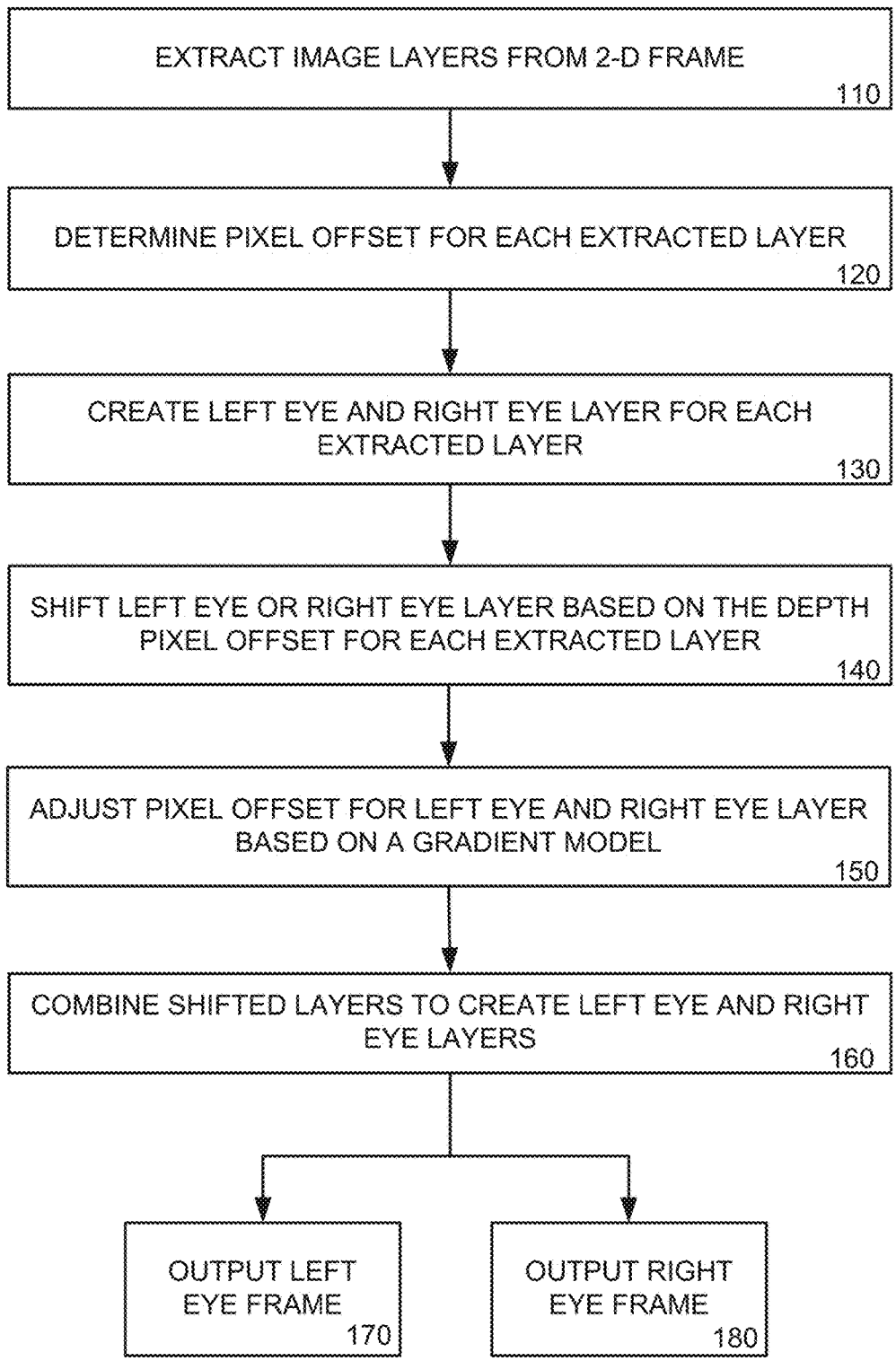
FIG. 1 is a flowchart of a method for converting a 2-D image to a stereoscopic 3-D image by extracting one or more object layers of the 2-D image and applying a pixel offset to each layer.

Aspects of the present disclosure involve methods and systems for generating stereoscopic depth and volume from a 2-D planar image by applying any of a plurality of gradient models to a 2-D image or feature of an image, and then providing the 2-D image or feature with stereoscopic depth and volume based on perceptual depth values of the gradient model. Through techniques discussed herein, a two-dimensional object may be stereoscopically placed along a perceptual z-axis by creating a copy of the two dimensional object, and horizontally and uniformly displacing the copy relative to the original. In one implementation, the pixel values in a copy of the image are displaced along the x-axis relative to the pixel values of the original image, and the degree of offset, when the copy and original are displayed for viewing in a stereoscopic environment, determines the direction and magnitude of the images location along the perceptual z-axis. Further, a two-dimensional object may be provided with stereoscopic volume by non-uniformly displacing some portions of the object copy relative to the original. Aspects of the present disclosure involve a toolkit of templates, such as shapes and jointed shapes, with stereoscopic depth map attributes. The system uses the depth map attributes of the shape to create stereoscopic volume for the image feature with a similar shape. The shape as well as the depth map attributes may be adjustable. In one particular implementation, the shapes have variable gradient gray scale attributes. The gray scale attributes of the shape, which corresponds to some image portion, are used to horizontally offset pixel values of a right or left eye image portion corresponding to the original left or right eye image. When the right and left eye images are displayed in accordance with a stereo optic viewing environment, the original image will have taken on stereoscopic volume for the portion of image processed with the toolkit shape.

The templates upon which the pixel offset for one or more pixels of the 2-D image may be adjusted provides the 2-D image with a finely tuned, nuanced stereoscopic 3-D effect when rendered in a stereoscopic 3-D environment. In this manner, the 2-D image may be converted to a corresponding 3-D image with a perceived depth. Further, this process may be applied to each image of an animated feature film to convert the film from 2-D to stereoscopic 3-D.

For convenience, the embodiments described herein refer to a 2-D image as a "frame" or "2-D frame." However, it should be appreciated that the methods and devices described herein may be used to convert any 2-D multimedia image into a stereoscopic 3-D image, such as 2-D multimedia images including a photo, a drawing, a computer file, a frame of a live action film, a frame of an animated film, a frame of a video or any other 2-D multimedia image.

Further, the term "layer" as used herein indicates any portion of a 2-D frame, including any object, set of objects, or one or more portions of an object from a 2-D frame. Thus, the depth model effects described herein may be applied to any portion of a 2-D frame, irrespective of whether the effects are described with respect to layers, objects or pixels of the frame.

Other embodiments of the present disclosure include techniques for using parallax data created when converting the 2-D frames into 3-D images to create a parallax based monoscopic rendering of content. In one embodiment, a computing device generates a plurality of images spanning a spectrum of viewpoints between viewpoint locations of a stereoscopic pair, e.g., a first eye image (e.g., left eye image) and a second eye image (e.g., right eye image), for the stereoscopic 3-D image. The computing device may also be configured to generate images at viewpoint locations that are extrapolated from the original viewpoint locations of a stereoscopic image pair in order to create new viewpoints that are beyond the range of the original stereoscopic pairs.

For example, if the original stereoscopic image pair includes a left eye image captured or viewed from a first location and a right eye image captured or viewed from a second location, the computing device may determine a plurality of viewpoint locations that fall between or outside of the original viewpoint locations for the stereoscopic image pair. These new viewpoint locations may then be used to generate new viewpoint images that are captured or viewed from the various viewpoint locations.

The computing device may use the 2-D content used to create the original left and right images of the stereoscopic pair to generate the new viewpoint images captured at viewpoints between the viewing locations of the stereoscopic pair. Alternatively or additionally the computing device may use the stereoscopic image pair itself (or data associated therewith) to generate the new viewpoint images.

The plurality of viewpoint images represent images that would be captured or viewed from a plurality of viewpoint locations and when shown sequentially produce a dynamic effect to a 2-D display. As one example, the plurality of images can be displayed sequentially on a 2-D display to provide the user with a sense of depth or that he or she is viewing the 2-D display from different locations (e.g., similar to walking around an object in real life). Alternatively or additionally, the sequence of images can be used to supplement or produce an animation in an image. Because the 2-D images are taken from various viewpoints along a spectrum between a predetermined 3-D parallax, as the images are displayed quickly, the user experiences an illusion of depth in the content being viewed.

In some instances, the sequence and/or selection of images display may be based on a user input. For example, a computing device may include one or more sensors, such as eye tracking, head tracking, or the like that detect movements by a user. The computing device then determines the one or more images to display based on the user movement. As another example, the computing device may include sensors (e.g., accelerometers, gyroscopes, capacitive touch sensors) and/or input/output devices that are configured to receive user input, and the computing device selects the one or more images to display based on the received user input.

As used herein the term "frame" is meant to encompass an image with a predetermined orientation of objects within a background, such as a frame within an animation sequence. The term "viewpoint image" is meant to encompass images of a particular frame taken from any viewpoint of that frame. For example, the plurality of viewpoint images may be created based on a single frame, where the viewpoint images show the characters in the same configuration and orientation, but from different viewing angles/locations. Original or stereoscopic viewpoint locations may be used to refer to the viewpoint locations of a pair of images displayed simultaneously to create a 3-D appearance when viewed by a user. In some examples the original viewpoint locations may be based on a desired depth and/or object volume for one or more objects and/or layers within the content.

In a first example, the user input is used to select a view location, the view location is then used to determine which image within a set of 2-D images should be displayed. In this example, as the user view location changes, the image displayed changes to give the user a different viewing location. Due to the volume effects defined when the stereo images are created as briefly explained above, this provides the user with a different view of each object within the image and provides additional data in the same way as if a user was walking around an object shown in the images. In a second example, the user input may determine not only the viewpoint but also the current frame that is displayed. In this example, viewpoint and a playback sequence may be correlated together so that as the user varies his or her input to the computing device, the frame playback (e.g., image sequence or animation sequence) may change correspondingly. In a third example, the user input changes the view location of the images displayed, while the sequence plays independently. In other words, a playback sequence will play regardless of the user viewpoint, but the images displayed for each frame of the animation will be based on the user viewpoint. The above examples illustrate some of the various uses for the interpolated viewpoint images that can be used to allow a user to experience the illusion of depth on a monoscopic screen without the use of 3-D accessories (e.g., polarized glasses or anaglyph glasses).

Creating 3-D Image Data From 2-D Images

A method of creating a stereo pair for 3-D image data will now be discussed. Turning now to the figures, FIG. 1 is a flowchart of a method for converting a 2-D multimedia frame to a stereoscopic 3-D multimedia frame by utilizing layers of the 2-D frame. Several operations of the method are described in detail in related United States Patent No. 8,502,862 entitled "Method and System for Utilizing Pre-Existing Image Layers of a Two-Dimensional Image to Create a Stereoscopic Image" by Tara Handy Turner et. al., the contents of which are incorporated in their entirety by reference herein. By performing the following operations for each frame of a 2-D animated film and combining the converted frames in sequence, the animated 2-D film may similarly be converted into a stereoscopic 3-D film. In one embodiment, the operations may be performed by one or more workstations or other computing systems to convert the 2-D frames into stereoscopic 3-D frames.

Figure 2:
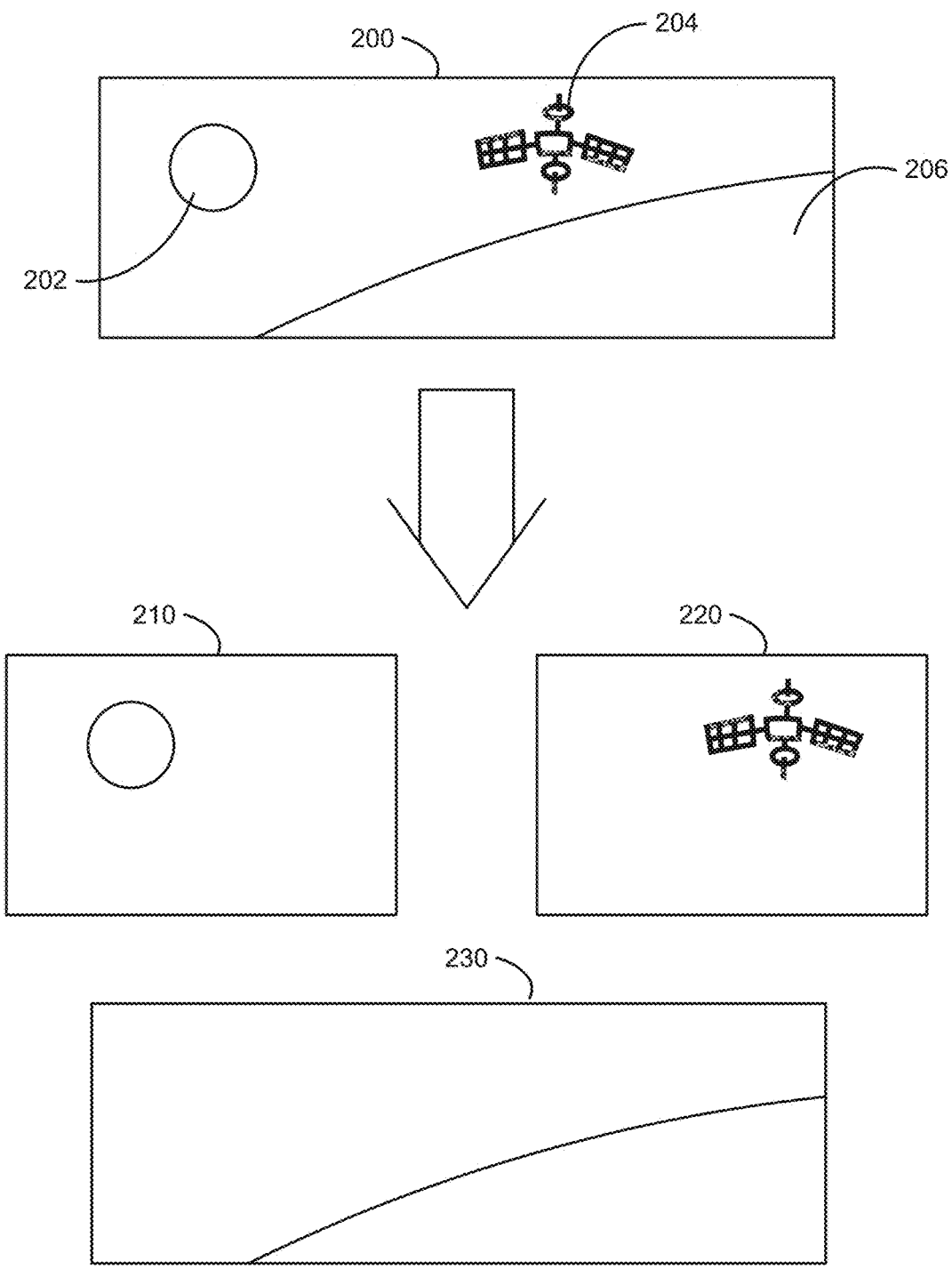
FIG. 2 is a diagram illustrating a plurality of layers of an image of an animated multimedia presentation.

The method may begin in operation 110 where one or more layers are extracted from the 2-D frame by a computer system. A layer may comprise one or more portions of the 2-D frame. The example 2-D frame 200 of FIG. 2 illustrates a space scene including three objects; namely, a moon 202, a satellite 204 and a planet 206. Each of these objects are extracted from the 2-D image or otherwise provided as separate layers of the frame 200. The layers of the 2-D image 200 may include any portion of the 2-D image, such as an object, a portion of the object or a single pixel of the image. As used herein, a layer refers to a collection of data, such as pixel data, for a discrete portion of image data where the meaningful color data exists for the entirety of the image or, in some examples, for some area less than the entirety of image data. For example, if an image consists of a moon 202, satellite 204 and a planet 206, image data for the moon may be provided on a layer and image data for the satellite and planet may be provided on separate and distinct layers. In general, each layer of a 2-D image is the same size as all of the other layers, such that those pixels of the layer that are not part of the objects of the layer are blank or otherwise carry no color information. However, the layers of the 2-D image may be any size and include any number of pixels.

The layers can be extracted from the composite 2-D frame in several ways. For example, the content of each extracted layer can be digitally extracted from the 2-D frame by a computing system utilizing a rotoscoping tool or other computer image processing tool to digitally remove a given object(s) and insert a given object(s) into a distinct layer. In another example, the layers for a 2-D frame may be digitally stored separately in a computer-readable database. For example, distinct layers pertaining to each frame of a cell animated feature film may be digitally stored in a database, such as the Computer Animation Production System (CAPS) developed by the Walt Disney Company in the late 1980s.

Figure 3:
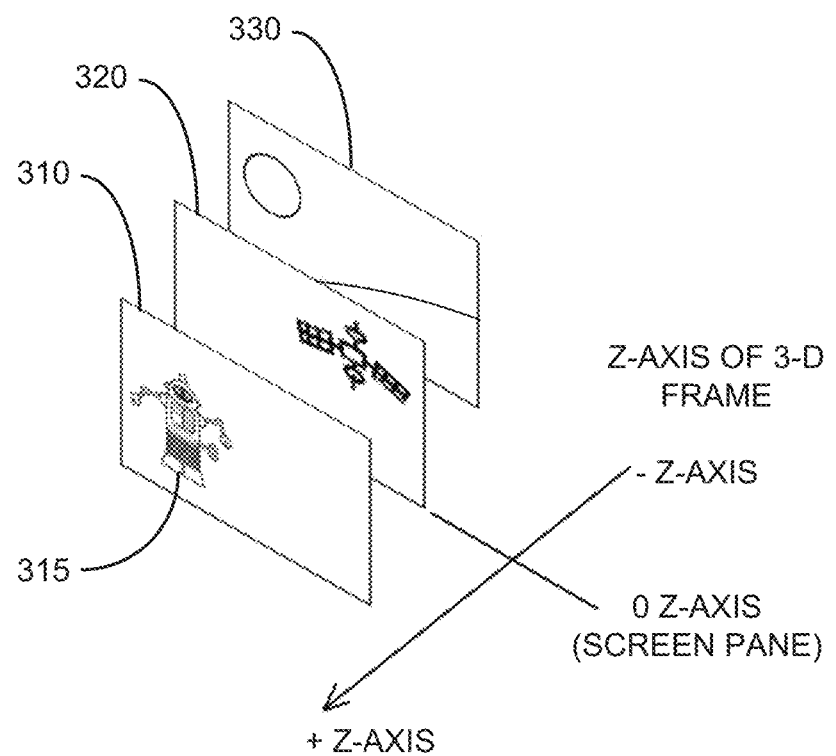
FIG. 3 is a diagram illustrating the position of several layers of a stereoscopic 3-D frame along a perceptual z-axis of the stereoscopic 3-D frame.

Upon extraction of a layer or otherwise obtaining layer pixel data, a user or the computing system may determine a pixel offset for the layer pixel data in operation 120. Each pixel, or more likely a collection of adjacent pixels, of the 2-D frame may have an associated pixel offset that determines the object's perceived depth in the corresponding stereoscopic 3-D frame. For example, FIG. 3 is a diagram illustrating the perceived position of several layers of a stereoscopic 3-D frame along a z-axis of the stereoscopic 3-D frame. As used herein, the z-axis of a stereoscopic 3-D frame or image represents the perceived position of a layer of the frame when viewed as a stereoscopic 3-D image. In one particular embodiment, any layer 310 of the stereoscopic 3-D frame appearing in the foreground of the frame has a corresponding positive z-axis position that indicates the position of the layer relative to the plane of the screen from which the stereoscopic 3-D frame is presented. Additionally, any layer 330 appearing in the background of the stereoscopic 3-D frame has a corresponding negative z-axis position while a layer 320 appearing on the plane of the screen may have a zero z-axis position. However, it should be appreciated that the layers of the frame are not physically located at a z-axis positions described herein. Rather, because the stereoscopic 3-D frame appears to have depth when viewed in stereoscopic 3-D, the z-axis position merely illustrates the perceived position of a layer relative to the screen plane of the stereoscopic 3-D frame. This position, and hence the screen plane in this example, very often corresponds to what is known as the point of convergence in a stereoscopic system. Further, it is not necessary that a positive z-axis position correspond to the layer appearing in the foreground of the stereoscopic 3-D frame and a negative z-axis position correspond to the layer appearing in the background. Rather, any value may correspond to the perceived position of the layer of the stereoscopic 3-D frame as desired. For example, in some computer systems, layers that are perceived in the background of the stereoscopic 3-D frame may have a positive z-axis position while those layers in the foreground have a negative z-axis position. In still another example, the zero z-axis position corresponds with the furthest perceived point in the background of the stereoscopic 3-D frame. Thus, in this example, every layer of the stereoscopic 3-D frame has a positive z-axis position relative to the furthest perceived point in the background. As used herein, however, a z-axis position value corresponds to the example shown in FIG. 3.

In the example of FIG. 3, each pixel of any particular layer of the 2-D frame has the same pixel offset. Thus, each object of the layer appears at the same z-axis position within the stereoscopic 3-D frame. Moreover, while each object, e.g. the moon 202, the satellite 204 and the planet 206, are given a z-axis depth, each object appears flat or with no volume. Stated differently, initially a pixel offset is applied uniformly to all pixels of a given object or layer. To provide a non-flat appearance of a given object and a more realistic stereoscopic 3-D effect, the pixel offset of one or more pixels of the layer is adjusted to add volume or a more detailed depth perception to the objects of the layer, or to otherwise provide non-uniformity to the object through variable pixel offsets.

For example, returning to FIG. 2, the moon 202 object has a round shape. While the stereoscopic depth of the moon layer 210 layer provides a stereoscopic depth as to the orientation of the moon in relation to the other shapes of the frame, the moon object itself still appears flat. Thus, to provide a volume stereoscopic 3-D effect to the moon 202 object, pixel offset for the pixels defining the moon object are adjusted such that the pixels of the moon are located either in the foreground or background of the stereoscopic 3-D frame in relation to the moon layer 210, or are not adjusted and are maintained at the moon layer, thereby providing the moon object with stereoscopic volume. Several techniques to apply volume to the layers of an frame are described in greater detail in related U.S. patent application Ser. No. 12/571,406 entitled "Method and System for Creating Depth and Volume in a 2-D Planar Image" by Tara Handy Turner et. al., the entirety of which is incorporated by reference herein. This volume process may be applied to any layer of the 2-D frame, including being applied to one or more objects of a particular layer. Thus, the volume applied to one object of a particular layer may differ from the volume applied to a separate object of the same layer. Generally, the stereoscopic volume may be applied individually to any aspect of the 2-D frame. Moreover, stereoscopic volume may be applied to any given object irrespective of its relation to a layer or any other object.

Additional stereoscopic techniques for pixel offset may be utilized to provide this volumetric and depth detail to the stereoscopic 3-D effect applied to the 2-D frame. One such adjustment involves utilizing gradient models corresponding to one or more frame layers or objects to provide a template upon which a pixel offset adjustment may be made to one or more pixels of the 2-D frame. For example, returning to FIG. 2, it may be desired to curve the planet 206 object of the planet layer 230 such that the planet appears to curve away from the viewer of the stereoscopic 3-D frame. To achieve the desired appearance of the planet 206, a gradient model similar in shape to the planet 206 object may be selected and adjusted such that the gradient model corresponds to the planet object and provides a template from which the desired stereoscopic 3-D effect may be achieved for the object. Further, in those layers that include several objects of the 2-D frame, gradient models may be created for one or more objects such that a single stereoscopic 3-D effect is not applied to every object of the layer. In one embodiment, the gradient model may take the form of a gray scale template corresponding to the object, such that when the frame is rendered in stereoscopic 3-D, the whiter portions of the gray scale gradient model corresponds to pixels of the object that appear further along the z-axis position (either in the foreground or background) of the layer than the pixels of the object that correspond to the darker portions of the gradient model, such that the object appears to extend towards or away from the viewer of the stereoscopic 3-D frame. Several techniques related to creating depth models to render a 2-D frame in stereoscopic 3-D frame are described in more detail herein.

Once the desired depth pixel offset and the adjusted pixel offset based on a volume effect or gradient model are determined for each layer and pixel of the 2-D frame in operation 120, corresponding left eye and right eye frames are generated for each layer in operation 130 and shifted in response to the combined pixel offset in operation 140 to provide the different perspectives of the layer for the stereoscopic visual effect. For example, to create a left eye or right eye layer that corresponds to a layer of the 2-D frame, a digital copy of the 2-D layer is generated and shifted, either to the left or to the right in relation to the original layer, a particular number of pixels based on the pixel offset for relative perceptual z-axis positioning and/or individual object stereoscopic volume pixel offsetting. Hence, the system generates a frame copy of the layer information with the x-axis or horizontal pixel values shifted uniformly some value to position the object along a perceptual z-axis relative to other objects and/or the screen, and the system further alters the x-axis or horizontal pixel position for individual pixels or groups of pixels of the object to give the object stereoscopic volume. When the corresponding left eye and right eye frames are viewed simultaneously or nearly simultaneously, the object appearing in the corresponding frames appears to have volume and to be in the foreground or background of the stereoscopic 3-D frame, based on the determined pixel offset. The left and right eye frames may be rendered based on a desired viewpoint location of each image, the viewpoint location typically corresponded to a desired depth appearance for the 2-D frame and so would be used as input to determine the depth pixel offset and/or the adjusted pixel offset.

In general, the shifting or offsetting of the left or right eye layer involves the horizontal displacement of one or more pixel values of the layer. For example, a particular pixel of the left or right eye layer may have a pixel color or pixel value that defines the pixel as red in color. To shift the left or right eye layer based on the determined pixel offset, the pixel value that defines the color red is horizontally offset by a certain number of pixels or other consistent dimensional measurement along the x-axis or otherwise horizontal, such that the new or separate pixel of the layer now has the shifted pixel value, resulting in the original pixel horizontally offset from the copy. For example, for a pixel offset of 20, a pixel of the left or right eye layer located 20 pixels either to the left or the right is given the pixel value defining the color red. Thus, there is a copy of the pixel horizontally offset (x-offset) from the original pixel, both with the same color red, 20 pixels apart. In this manner, one or more pixel values of the left or right eye layer are horizontally offset by a certain number of pixels to create the shifted layer. As used herein, discussion of "shifting" a pixel or a layer refers to the horizontal offsetting between the original pixel value and its copy.

Figure 4:
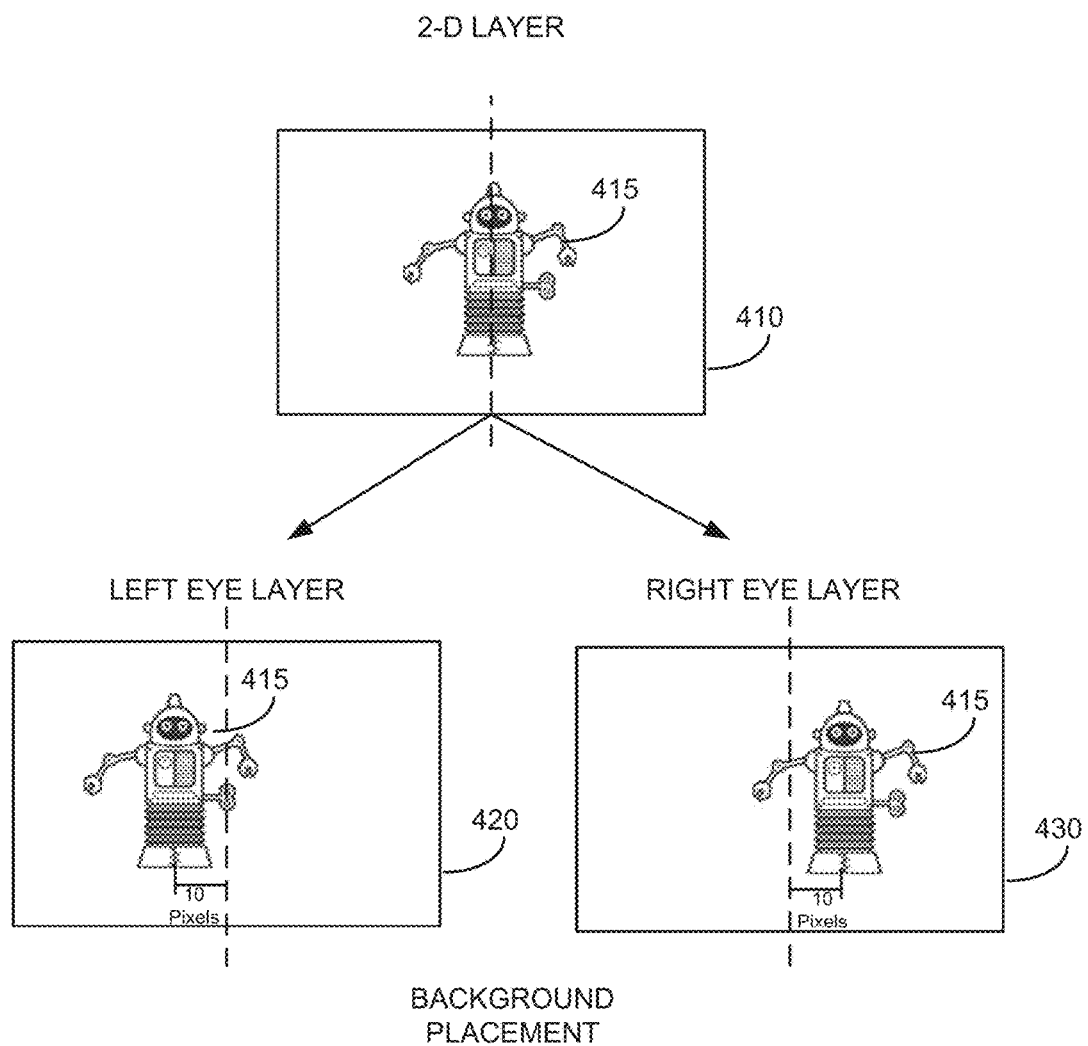
FIG. 4 is a diagram illustrating the creation of corresponding left eye and right eye image layers from a 2-D image layer, with both image layers shifted such that the total pixel shift of the image layers equals a determined pixel offset.

FIG. 4 is a diagram illustrating the creation of corresponding left eye and right eye layers from a 2-D layer, with both left eye and right eye layers shifted such that the total pixel shift of the layers equals the depth pixel offset. As shown in FIG. 4, a left eye layer 420 and a right eye layer 430 are created from the 2-D layer 410 such that the combination of the left eye layer and the right eye layer provides a stereoscopic 3-D effect to the contents of the layer. In this embodiment, the left eye layer 420 is shifted to the left while the right eye layer 430 is shifted to the right along the x-axis in response to a pixel offset. Generally, the shifting of the left eye and/or right eye layers occur in the x-axis only. When the shifted right eye layer 430 and the shifted left eye layer 420 are viewed together, the robot character 415 appears in the background, or behind the screen plane. To place a layer in the foreground of the stereoscopic 3-D frame, the corresponding left eye layer 410 is shifted to the right while the right eye layer 420 is shifted to the left along the x-axis. When the shifted right eye layer 420 and the shifted left eye layer 410 are viewed together, the robot character 415 appears in the foreground of the frame, or in front of the screen plane. In general, the depth pixel offset is achieved through the shifting of one of the left eye or right eye layers or the combined shifting of the left eye and the right eye layers in either direction.

The number of pixels that one or both of the left eye and right eye layers are shifted in operation 140 may be based on the depth pixel offset value. In one example, the pixel offset may be determined to be 20 total pixels, such that the layer may appear in the background of the stereoscopic 3-D frame. Thus, as shown in FIG. 4, the left eye layer 420 may be shifted ten pixels to the left from the original placement of the 2-D layer 410, while the right eye layer 430 may be shifted ten pixels to the right. As can be seen, the robot character 415 of the left eye layer 420 has been displaced ten pixels to the left of the center depicted by the vertical dashed line while right eye layer 430 has been displaced to the right of center by ten pixels. Thus, the total displacement of the layers between the left eye layer 420 and the right eye layer 430 is 20 pixels, based on the determined pixel offset. It should be appreciated that the particular number of pixels that each layer is shifted may vary, as long as the number of pixels shifted for both layers equals the overall pixel offset. For example, for a 20 pixel offset, the left layer may be shifted five pixels while the right layer may be shifted 15 pixels. Shifting the left and right eye layers in this way will result in a slightly different perspective of the layer than shifting in equal amounts, but this result may generate a desired creative effect or may be negligible to the viewer while being advantageous for the purposes of simplifying an image processing step such as the extraction of the layer.

Returning to FIG. 1, in operation 150, the computer system adjusts the pixel offset of a layer or object based on a stereoscopic volume or applied gradient model. The system orients a given object or layer along a perceptual z-axis by generating a copy of the object or layer and positioning the object and its copy relative to each other along an x-axis or horizontally. The degree of relative positioning determines the degree of perceptual movement fore and aft along the perceptual z-axis. However, a given object initially appears flat as the object and its copy are uniformly displaced. To provide an object with stereoscopic volume and depth, portions of an object and the corresponding portion of the object copy are relatively positioned differently (more or less) than other portions of the object. For example, more or less x-axis pixel offset may be applied to some portion of an object copy relative to other portions of an object copy, to cause the perceived position of some portion of the object to be at a different position along the perceptual z-axis relative to other portions of the object when the left and right eye layers are displayed.

In one embodiment, a gradient model including a gray scale template is created and applied to an object or layer of the 2-D frame such that, after application of the pixel offset to the left eye layer and the right eye layer, the whiter portions of the gradient model correspond to areas of the 2-D image that appear further in the foreground than the areas corresponding to the darker portions. Stated differently, the gradient model gray scale provides a map or template from which the adjusted pixel offset for each pixel of an object or layer may be determined. In this manner, stereoscopic volume and depth is applied to an object for a more detailed stereoscopic appearance of one or more objects of the frame. It should be appreciated, however, that the gradient model may include any method to represent depth, other than a gray scale template. For example, the gradient model may include a plurality of colors, a collection of numeric values, or simple instructions to represent depth. One example of simple instructions include a direction (background or foreground) and a degree of depth that relates to a pixel offset. It should be noted that the specified pixel offset is a creative determination defining the desired perceived location of the feature to the viewer, which can be derived by utilizing the direct mathematical relationships between the relative position of the viewer to the screen plane, the horizontal size of the screen plane and the pixel resolution of the stereoscopic frame being viewed.

Therefore, based on the determined depth pixel offset (which perceptually positions a layer along the perceptual z-axis of the stereoscopic 3-D frame) and the gradient model pixel offset (which adjusts the depth pixel offset for one or more pixels of an object to provide the object with the appearance of having volume and a more detailed depth), the left eye layer and right eye layer, and specific portions of the left and/or right eye layer, are shifted to provide the stereoscopic 3-D frame with the desired stereoscopic 3-D effect. Thus, in some embodiments, each pixel of a particular stereoscopic 3-D frame may have an associated pixel offset that may differ from the pixel offsets of other pixels of the frame. In general, any pixel of the 2-D frame may have an associated pixel offset to place that pixel in the appropriate position in the rendered stereoscopic 3-D frame.

Operations 110 through 150 may repeated for each layer of the 2-D frame such that corresponding left eye layers and right eye layers are created for each layer of the frame. Thus, upon the creation of the left eye and right eye layers, each layer of the frame has two corresponding layers (a left eye layer and a right eye layer) that is shifted in response to the depth pixel offset for that layer and to the volume pixel offset for the objects of the layer.

In operation 160, the computer system combines each created left eye layer corresponding to a layer of the 2-D frame with other left eye layers corresponding to the other layers of the 2-D frame to construct the complete left eye frame to be presented to the viewer. Similarly, the computer system combines each right eye layer with other right eye layers of the stereoscopic 3-D frame to construct the corresponding right eye frame. The combined left eye frame is output for the corresponding stereoscopic 3-D frame in operation 170 while the right eye frame is output for the corresponding stereoscopic 3-D frame in operation 180. The left eye frame corresponds to a first or left viewing location and the right eye frame corresponds to a second or right viewing location horizontally shifted along a lateral axis relative to the left eye frame.

When the left eye frame and the right eye frame are viewed simultaneously or nearly simultaneously, the two frames provide a stereoscopic effect to the frame, converting the original 2-D frame to a corresponding stereoscopic 3-D frame. For example, some stereoscopic systems provide the two frames to the viewer at the same time but only allows the right eye to view the right eye frame and the left eye to view the left eye frame. One example of this type of stereoscopic systems is a red/cyan stereoscopic viewing system. In other systems, the frames are provided one after another while the system limits the frames to the proper eye. Further, to convert a 2-D film to a stereoscopic 3-D film, the above operations may be repeated for each frame of the film such that each left eye and right eye frame may be projected together and in sequence to provide a stereoscopic 3-D effect to the film.

Figure 5:
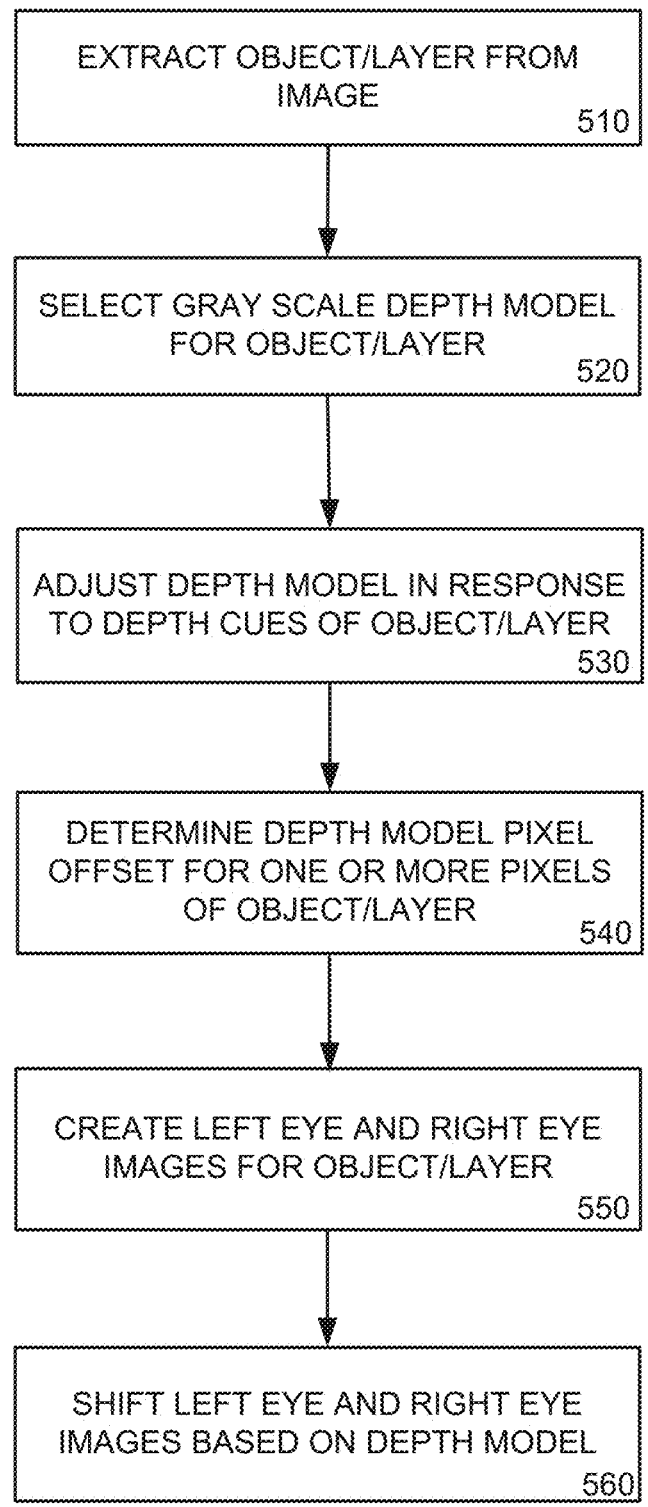
FIG. 5 is a flowchart of a method for adding depth to a 2-D image through the utilization of a gradient model.

As described, the stereoscopic 3-D effects of a frame may be based on variety of techniques, such as perceptual z-axis positioning, inflation, and use of gradient models. The utilization of a gradient model, also referred to as templates, to create an stereoscopic 3-D effect to the frame is discussed herein. Particularly, FIG. 5 is a flowchart of a method for generating stereoscopic depth for one or more objects of a 2-D frame through the utilization of a gradient model. The operations of FIG. 5 may be performed by one or more computing systems, with some creative input and manipulation by an animator or artist. The method of FIG. 5 is described in the context of generating stereoscopic volume and depth for an object or layer, which is obtained from a collection of layers that form a frame of a film. The method of FIG. 5, however, is not limited to such an environment and may be applied to a discrete image or a portion of an image in digitized form, although the image may originate from a hand drawn picture.

Beginning in operation 510, one or more layers or objects are extracted from the 2-D frame, selected or otherwise obtained. In operation 520, the computer system obtains a gray scale gradient model for application to the extracted layer such that each pixel of the gradient model corresponds to one or more pixels of the layer. The system may obtain a gradient model by automated comparison of the image shape against a plurality of gradient model shapes. Alternatively, a user may select a gradient model, from a plurality of gradient models, with a shape similar to that of the image for which the model will be used to provide stereoscopic depth. The gradient models may include a gray scale template comprising various shades of a gray color (including white and black) for each pixel of the gradient model. Several examples of gray scale gradient models are discussed herein, but it should be appreciated that the gradient models may take any shape. In one embodiment, the computer system may select from a list of several gradient models to apply to the layer or portions of the layer. In another embodiment, the gradient model may be drawn or otherwise created to correspond to a layer, an object or a portion of either. For example, a layer may include a character object of a 2-D frame. However, it may be desired to provide a stereoscopic 3-D effect to the arm of the character separate from the rest of the character object, such as if the character is pointing into the foreground of the stereoscopic 3-D frame. In this example, a gradient model may be created that takes the relative shape of the arm of the character, or closely resembles the general arm shape, such that the pixel offsets corresponding to the pixels defining the character's arm may be determined to provide the appearance that the arm has a stereoscopic 3-D depth.

It is also possible to apply different gradient models to different portions of an image. For example, in the context of an image of a hot air balloon, a circular gradient model, perhaps after being elongated, may be used to provide the balloon portion with stereoscopic depth, whereas a rectangular gradient model may be used to provide the basket portion with stereoscopic depth.

Figure 6:
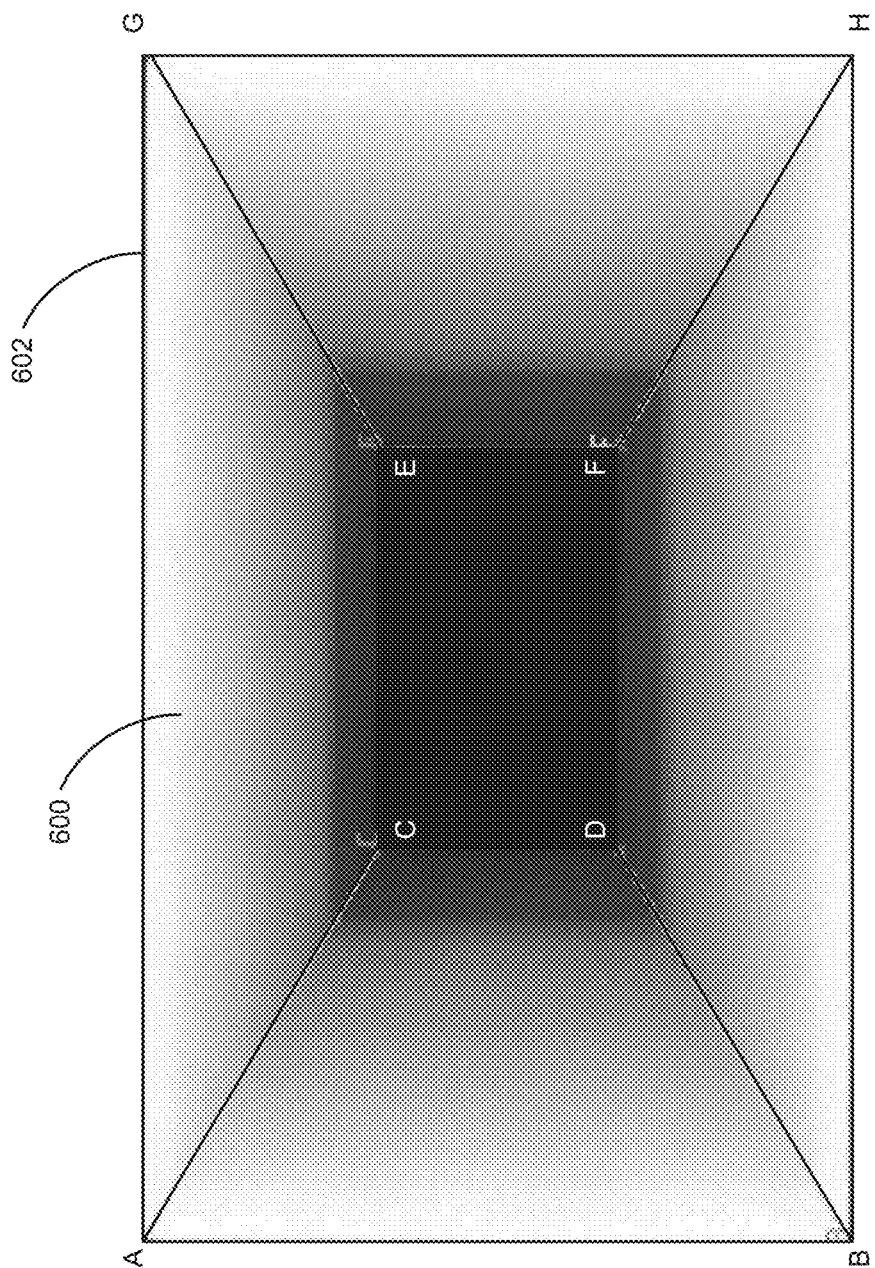
FIG. 6 is a diagram of a trapezoidal gradient model for adding depth to a 2-D image when rendered in stereoscopic 3-D.
Figure 10:
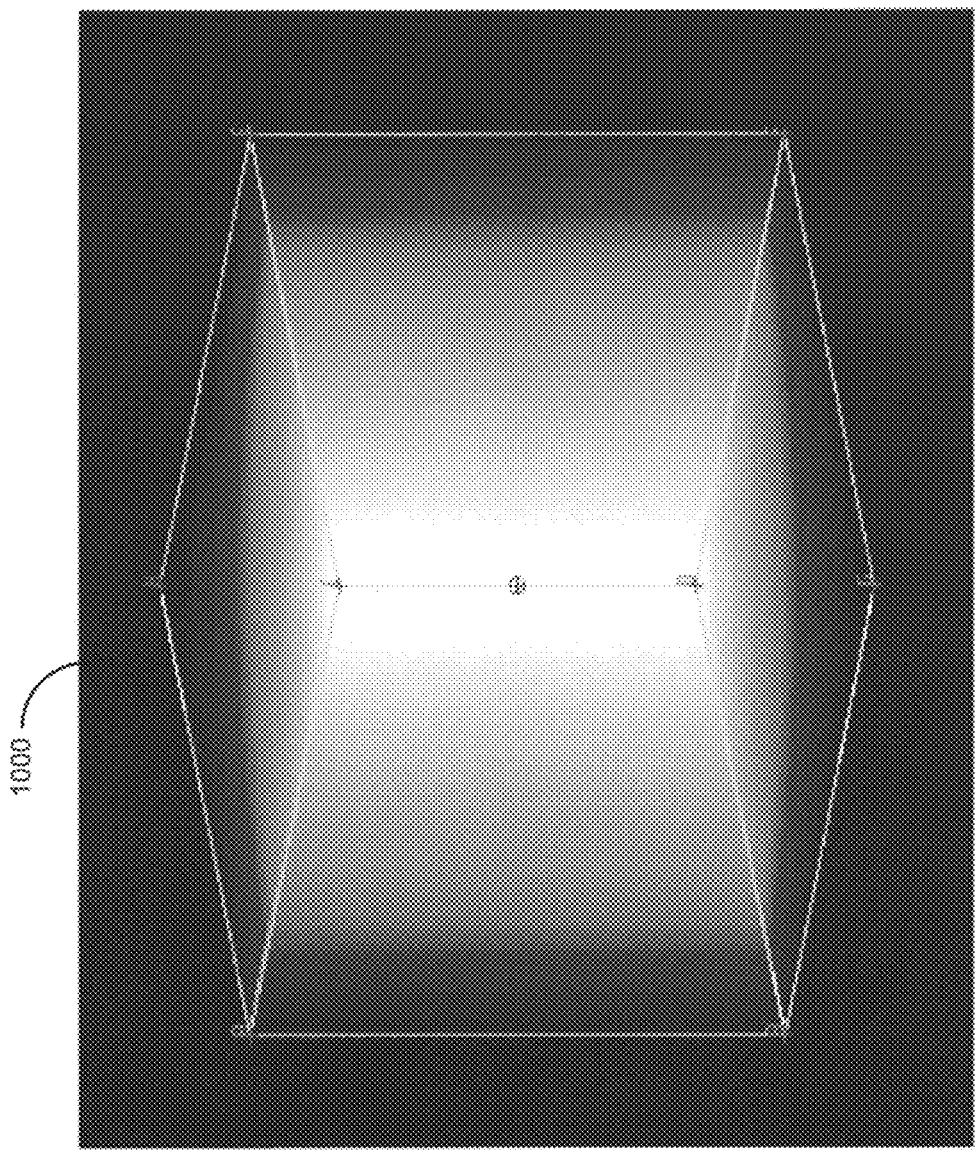
FIG. 10 is a diagram of a cube point gradient model for adding depth and volume to a 2-D image when rendered in stereoscopic 3-D.
Figure 11:
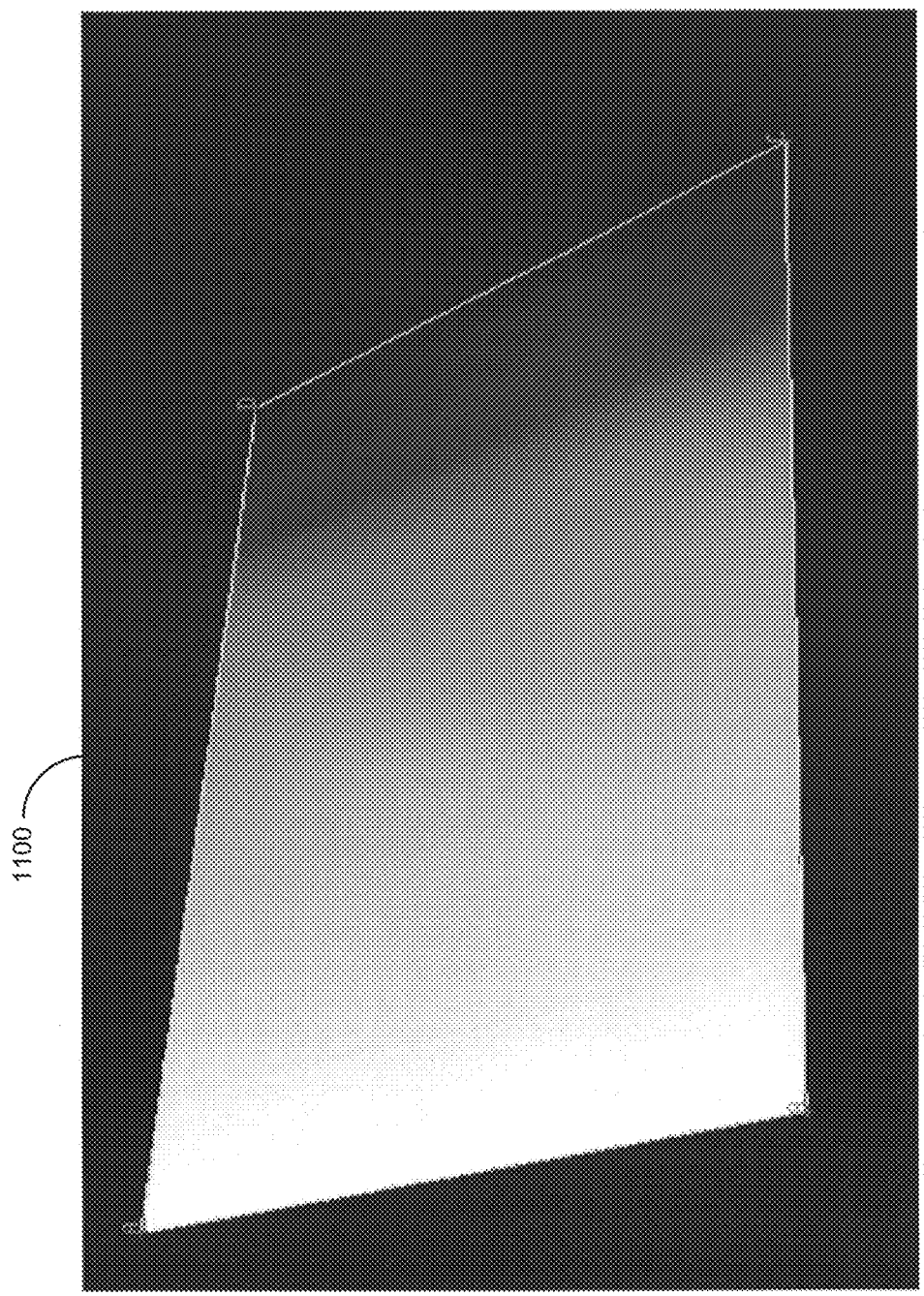
FIG. 11 is a diagram of a quadrangle gradient model for adding depth and volume to a 2-D image when rendered in stereoscopic 3-D.
Figure 12:
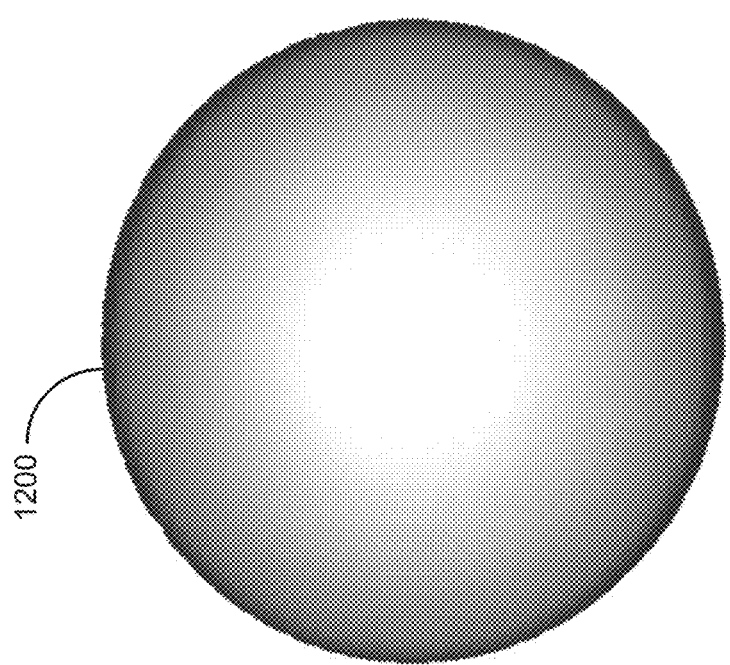
FIG. 12 is a diagram of a radial gradient model for adding depth and volume to a 2-D image when rendered in stereoscopic 3-D.
Figure 13:
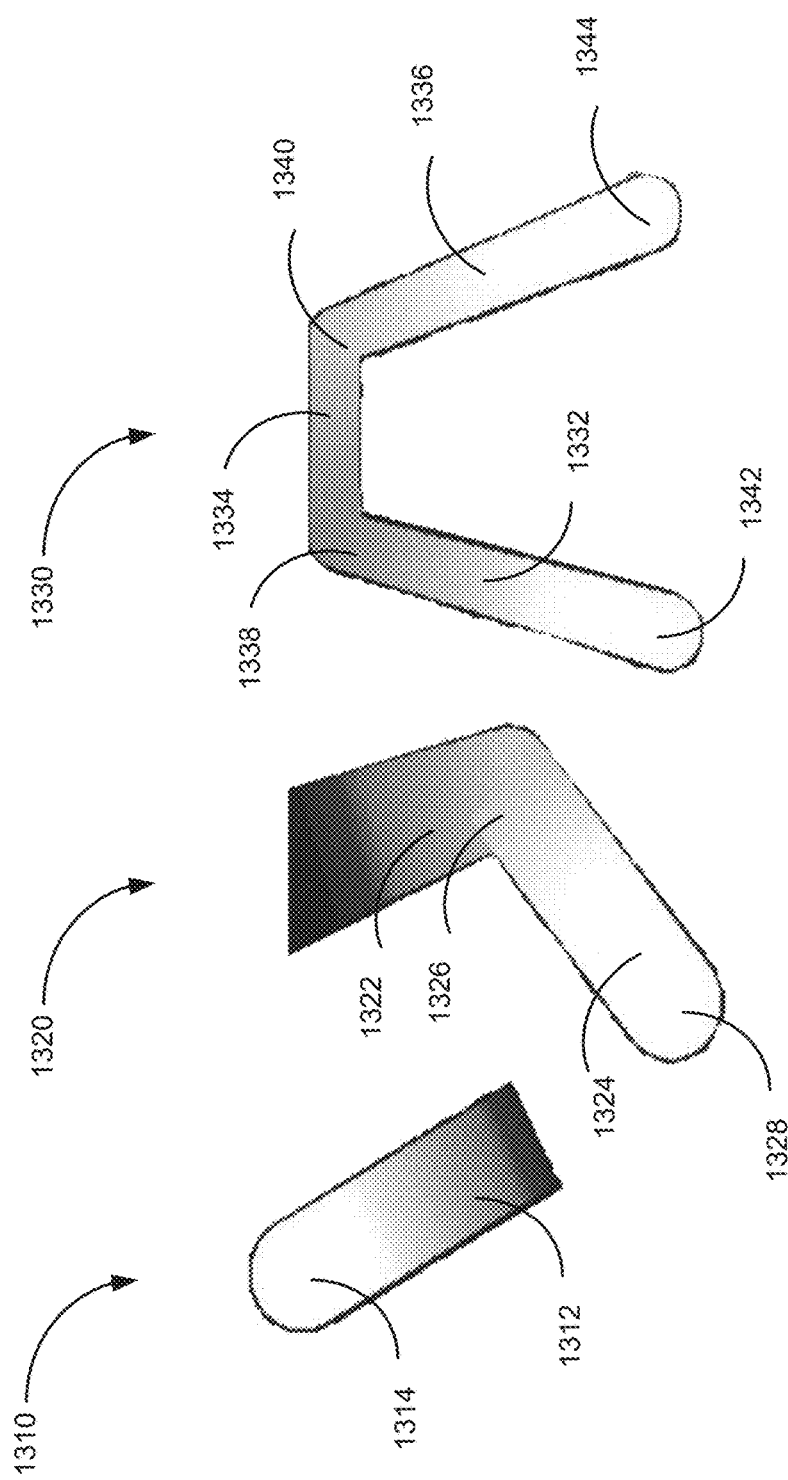
FIG. 13 is a diagram of a plurality of jointed gradient models for adding depth and volume to a 2-D image when rendered in stereoscopic 3-D.

Several examples of gradient models are provided herein. FIG. 6 is a diagram of a trapezoidal gradient model that may be selected to provide a tunnel stereoscopic effect to an object, for example. FIG. 10 is a diagram of a cube point gradient model that may be used to provide volume and depth to a house or a room, for example. FIG. 11 is a diagram of a quadrangle gradient model that may be utilized to provide a road or ground level the appearance of coming into the foreground and falling into the background, for example. FIG. 12 is a radial gradient model that provides a rounded object with the appearance of volume, for example. FIG. 13 includes several diagrams of jointed gradient models that may be used to provide an arm of a character object or other jointed object the appearance of extending into the background or foreground of a stereoscopic 3-D frame. The gradient models may be fixed in shape and size, or may include one or more control points that a user may select to alter the size and shape of the gradient model.

The operations of FIG. 5 are described herein with relation to the gradient model illustrated in FIG. 6. However, any gradient model may be used in relation to the operations of FIG. 5. As described, FIG. 6 is a diagram of a first example of a gray scale gradient model, namely a trapezoidal gradient model for determining a pixel offset of the pixels of a 2-D frame. This particular gradient model 600 comprises several trapezoid shapes bounded by a larger rectangle 602 (defined by points A, B, G and H) and a smaller second rectangle shape 604 (defined by points C, D, E and F) located within the larger rectangle. Further, the edges of the trapezoid shapes are defined by a line connecting the corners of the larger rectangle 602 to the smaller rectangle 604. The depth model also includes a gray scale template that is bounded by the trapezoidal shapes, such that the larger rectangle defines the outer boundary of the gray scale template and the smaller rectangle defines the inner boundary of the gray scale template. Further, the color of the gray scale template varies across the trapezoidal gradient model 600 such that the edges defined by the larger rectangle 602 of the gray scale template are whiter in color than the edges defined by the smaller rectangle 604, which are black or nearly black. Thus, the gray scale template defines a shape bounded by the larger and smaller rectangles that transitions uniformly from a white color near the outer edges 602 to a black color at the inner edges 604. However, it is not required that the gray scale template be applied in such a manner. Generally, a gray scale template may correspond to an object in any manner such that each pixel of the template corresponds to one or more pixels of the object and includes a shade of gray (including white and black) from which a pixel offset may be determined. For example, the outer boundary may be black and the inner boundary white, or each point (A through H) may have a unique value between black and white.

Figure 7:
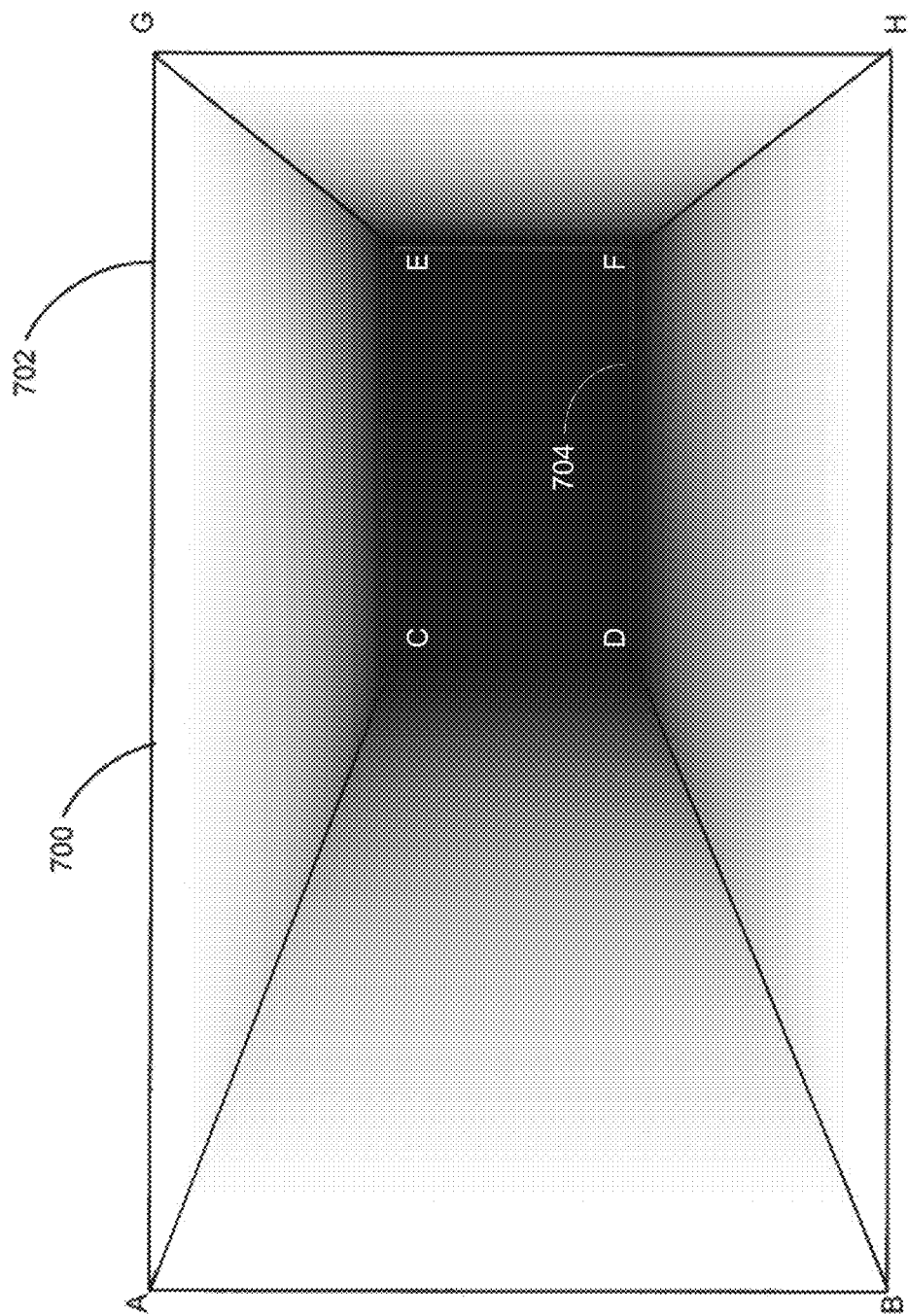
FIG. 7 is a diagram of a trapezoidal gradient model superimposed on a layer of a 2-D image to add depth to the 2-D image when rendered in stereoscopic 3-D.

Upon selection of the gray scale gradient model, an animator or artist adjusts the model in response to one or more indicators of a layer or object in operation 530. In one example, the trapezoidal gradient model 600 of FIG. 6 is applied to a portion of a layer rather than the entire layer. Thus, the user may shrink or otherwise adjust the size of the larger rectangle 602 and smaller rectangle 604 that define the gray scale template such that the gradient model approximates the shape of a particular portion of the layer, such as a hallway located off to one side of the layer. Such a gradient model 600 provides a tunnel stereoscopic 3-D effect to the hallway portion of the frame, without altering the rest of the layer. Another example is shown in FIG. 7. FIG. 7 a diagram of a trapezoidal gradient model for a layer of a 2-D frame to add depth and volume to the 2-D frame when rendered as a stereoscopic 3-D frame. As shown in FIG. 7 and in comparison with the gradient model of FIG. 6, the corners of the trapezoidal gradient model 600 have been moved or altered to adjust the gradient model for the objects of a layer. In particular, points A and B of the larger rectangle 702 has been moved horizontally to the right to stretch the larger rectangle. Further, the entire smaller rectangle 704 has been shifted horizontally to the right. However, it should be appreciated that the aspects of the gradient model 700 may be adjusted in any manner, including adjusting the angles of the lines that define the model. Generally, any aspect of the shape of a gradient model 700 may be manipulated to map more closely to an object or set of objects of a layer. Thus, the outer and inner boundaries of the gradient model 600 may be adjusted into any four sided shape, not just rectangles to define the boundaries of the gray scale template.

In addition, the various aspects of the gradient models may be animated to mirror or approximate the movement of an object of a scene of an animated or live-action film. For example, a scene may include several frames that, when displayed in sequence, shows an animated ball bouncing into the background of the scene. As described herein, a radial gradient model 910 is utilized to provide the ball object with a stereoscopic volume. In some embodiments, the radial gradient model is applied to each frame of the scene individually. In alternate embodiments, however, a first key frame is identified as a starting point for the animated gradient model, such as a frame when the bouncing ball object is at the lowest point. A second key frame is also identified, such as a frame when the ball object is at the highest point. To provide for the animated gradient model, a radial gradient model is applied to the ball object in the first key frame to provide a starting set point for the gradient model and another radial gradient model is applied to the ball object in the second key frame to provide an ending set point. A computer system then determines the movement of the radial gradient model from the starting set point to the ending set point, such that the radial gradient model appears to animate with the same movement as the ball object. The movement of the gradient model is determined through a interpolation or in-between process. Through this technique, a gradient model is utilized to provide the gradient models for an entire scene for an object, thereby reducing the amount of time needed to provide stereoscopic effects to the scene.

Any aspects of the gradient models may be animated in this manner. In one example, the shape of the gradient model is altered to mirror or approximate an object of a scene that also has a changing shape. This is achieved by providing a plurality of set points of the object that define the change in shape of the object. Further, the gray scale associated with any gradient model may also be animated. In one example, an object moves between the foreground and background of the stereoscopic frame during a scene of a film. Thus, in a similar manner as described, the gray scale of a gradient model is also animated by providing a plurality of set points that define the movement of the object through the perceptual z-axis of the stereoscopic scene.

Figure 8:
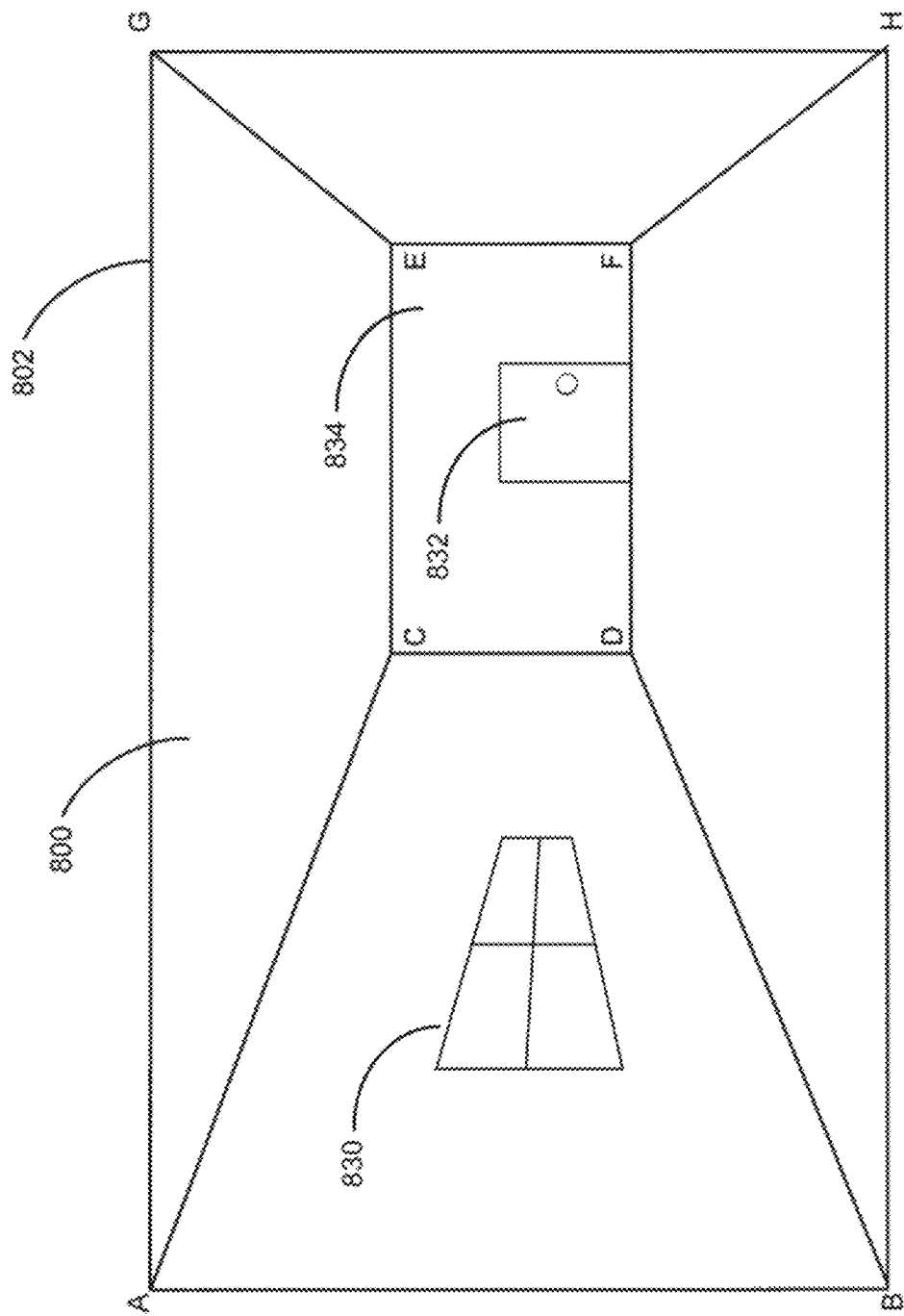
FIG. 8 is a diagram illustrating features of a layer for which the altered gradient model of FIG. 7 may provide a template.

FIG. 8 is a diagram illustrating features of a layer for which the altered gradient model of FIG. 7 may provide a template. The layer 800 includes several features of a 2-D frame that correspond to the altered gradient model. For example, the layer 800 includes a room scene, with a window 830 and a door 832. Further, the shape of the room has the shape similar to the gradient model of FIG. 7. Namely, the far wall 834 of the room has similar dimensions as the smaller rectangle 704 of the gradient model, with the other walls of the room having similar dimensions to the gray scale template of the gradient model 700.

Further, the gradient model 700 provides a gray scale template, or other stereoscopic depth attributes, that when applied to the layer as described herein, provides the room layer 800 with the appearance, when viewed with the appropriate stereo viewing glasses or otherwise, of extending into the background of a stereoscopic 3-D frame. In one example, the side walls of the room layer 800 appear to extend into the background. Such an effect may be achieved through the utilization of the altered gradient model 700 of FIG. 7. Generally, as described herein, the gray scale portion of the gradient model 700 provides a template from which a pixel offset for the pixels of the layer 800 may be determined. In this particular example, the far wall 834 of the room layer is provided with a depth pixel offset that places the far wall in the background of the stereoscopic scene. Thus, to provide the tunnel stereoscopic effect to the room layer, the dark colored pixels of the gradient model 700 corresponds to pixels of the layer 800 that have little to no pixel offset based on the gradient model while the lighter colored pixels of the gradient model correspond to pixels of the layer that have a large pixel offset, effectively locating those pixels in foreground of the 3-D frame. Stated differently, through perceptual z-axis depth pixel offsetting, the far wall is first positioned in the back of the frame and then the gradient tool is used to perceptually pull the side walls forward from the far wall. Thus, through application of the gradient model 700 to the various pixel offsets of the layer 800, the layer may achieve a desired tunnel effect that provides the layer with perceived stereoscopic depth and volume.

The manipulation of the aspects of the gradient model may be performed in a variety of ways. In one embodiment, an artist or animator manually adjusts the gradient model through a mouse-type device or other input device to a computer system, such as by pointing and clicking, and then manipulating the gradient shape (e.g., dragging corner joint C from the position shown in FIG. 6 to FIG. 7). In another embodiment, the artist adjusts the aspects of the gradient model by providing coordinates, such as [x,y] positions for the one or more points of the gradient model. In still another embodiment, the shape of the gradient model is adjusted automatically by the computer system in response to several aspects of the 2-D frame. Through manipulation of the shape, the gradient model may better represent the desired stereoscopic 3-D effect for the layer. Such effects may be based on the content of the layer, such as the number and shape of the objects of the layer and certain coloring effects, such as lighting and shading.

To further adjust the shape of the gradient models, one or more cues as to the proper depth of the various features of an object is obtained from the 2-D frame. For example, the 2-D frame from which the object is extracted may be an animated frame including several ink lines that define several features of the object, such as ink lines that define a character's facial features, clothing and/or appendages. Such ink lines may be considered when applying a gradient model to the layer. For example, the ink lines of a 2-D frame may provide a sense of depth by making objects in the foreground of the frame larger than similar objects in the background of the frame. Such a perception may be indicated in a character's arm by making the hand larger than the rest of the arm, thereby indicating that the hand is located further the foreground of the stereoscopic 3-D frame than the rest of the character. Thus, by analyzing the ink lines of the character or object, separate portions of the object may be given an adjusted pixel offset value that is more or less than the pixel offset of the rest of the object to provide a more detailed stereoscopic 3-D effect to the object. Several techniques may be utilized to identify and isolate portions of the object to perform gradient modeling. Several such techniques are described in more detail in U.S. Pat. No. 8,351,689 entitled "Apparatus and Method for Removing Ink Lines and Segmentation of Color Regions of a 2-D Image for Converting 2-D Images into Stereoscopic 3-D Images" by Tara Handy Turner et. al., the contents of which are incorporated in their entirety by reference herein.

Returning to FIG. 5, once the gradient model is created and altered as desired by the computer system or animator to resemble the layout of a layer or object, the computer system may determine a pixel offset for the object in operation 540 based on the gray scale template of the gradient model. The pixel offset determined in operation 540 may be a combination of the depth pixel offset applied to the layer from which the object is obtained and an adjusted pixel offset based on a gradient model gray scale template corresponding to the layer. Generally, each pixel defining the object has an initial depth pixel offset that relates to the overall perceived depth of the object in the stereoscopic 3-D frame. Thus, the pixel offset determined in operation 540 may be in addition to the depth pixel offset already associated with a pixel of the object or layer. In alternate embodiments, a volume pixel offset based on a gradient model may be associated with a particular pixel before the depth pixel offset is determined. Irrespective of the order in which the depth pixel offset and gradient model pixel offset are determined, the total pixel offset for any particular pixel of the 2-D frame may include both pixel offsets.

Figure 9A:
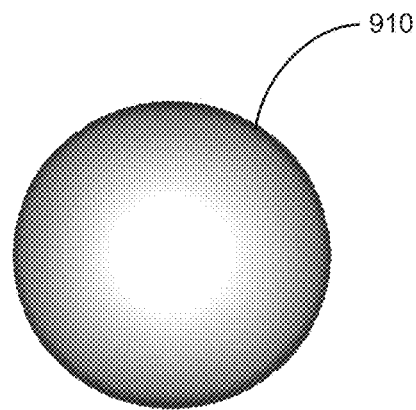
FIG. 9A is a diagram illustrating one example of a gray scale gradient model for a generally circular object of a 2-D frame.
Figure 9B:
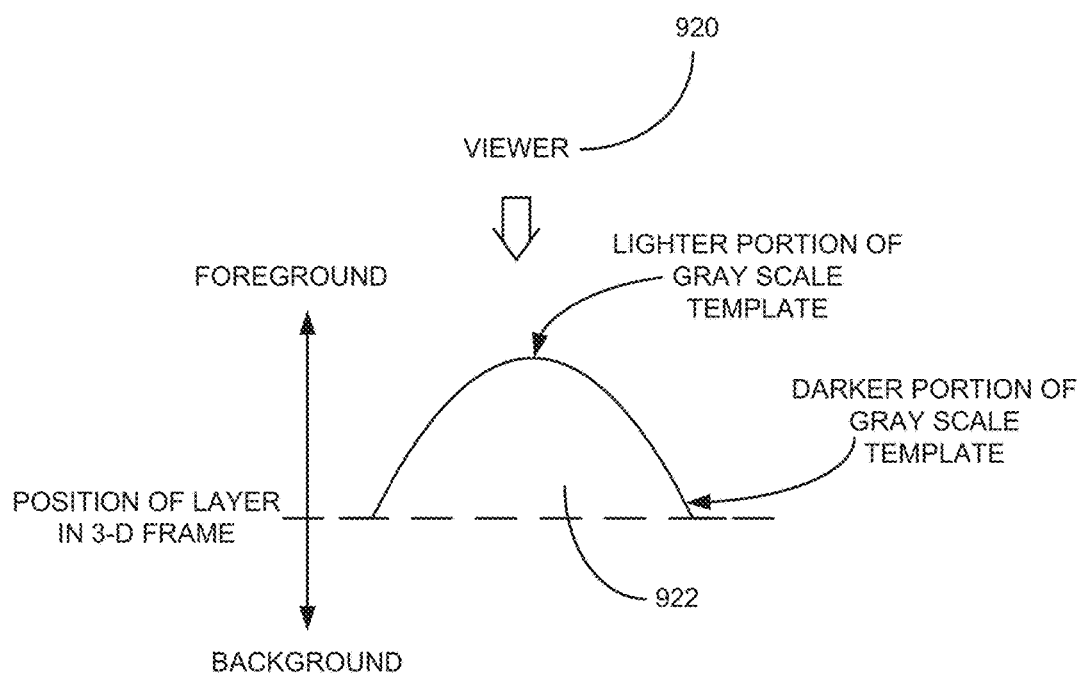
FIG. 9B is a diagram illustrating the volume effect of an object of a 2-D frame in relation to the gray scale gradient model.

The gradient model gray scale may be utilized to specify a pixel offset for one or more pixels of the layer that determines the depth that each pixel of the layer may appear in the stereoscopic 3-D frame. For example, FIGS. 9A and 9B are diagrams illustrating the volume effect of a generally round object of a 2-D frame in relation to a gray scale gradient model. FIG. 9B is a top view of the perceived volume of the round object of the 2-D layer corresponding to the gray scale gradient model set out in FIG. 9A. Thus, to a viewer 920 of the stereoscopic 3-D frame, the object appears to extend into the foreground of the 3-D frame. As should be appreciated, the diagram of 9B is merely an illustration of the stereoscopic volume of an object. The object does not physically extend into the foreground of frame, but only appears as such when the left eye and right eye layers of the 3-D frame are viewed by the viewer.

As shown, the object 922, after application of the gradient model gray scale, appears to the viewer 920 to have a stereoscopic 3-D volume that is based on the gradient model 910 provided in FIG. 9A. In this example, the whiter portions of the gradient model 910 correspond to the center of the object while the darker portions of the gradient model map to the edges of the round object. Further, based on the shades of the gradient model 910, the pixels of the object that correspond to the whiter portions of the gradient model may have a greater pixel offset than that of the pixels of the object that correspond to the darker portions of the gradient model, with each shade of gray between the white and dark portions receiving a sliding scale of pixel offsets. Thus, a pixel offset for each pixel of the round object may be determined based on the shades of gray contained within the gradient model 910. Further, the larger the pixel offset the further into the foreground or background the pixel may be perceived in the 3-D frame. Thus, when the object 922 is rendered in stereoscopic 3-D, the center of the object (with larger pixel offsets) may appear further in the foreground of the stereoscopic 3-D frame when compared to the edges of the object (with smaller pixel offsets). In this manner, each pixel of the object may correspond to a shade of gray in the gradient model and have an associated pixel offset that is based on the shade of gray for that particular pixel to provide the object with the appearance of stereoscopic volume or depth.

It should be appreciated that the pixel offset applied to the object may be based on the gradient model in any manner. For example, the darker portions of the gradient model 910 may provide a larger pixel offset than the whiter portions, or only those pixels colored with a specific shade of gray from the gradient model may have a pixel offset. Further, the pixel offset applied to a pixel of the object may place the pixel either in the foreground or in the background in relation to the other pixels of the object. In other words, the pixel offset for any particular shade of gray of the gradient model may have a value as well as a direction (foreground or background). For example, a grayscale value of 50% gray may indicate no pixel offset at the corresponding pixel location while a value of black places the pixel in the background and a value of white may place the pixel in the foreground with respect to the rest of the object. In general and used herein, however, those portions of the object with larger pixel offset may be perceived further from the rest of the object and closer to the viewer when viewed in stereoscopic 3-D. Those portions with smaller pixel offsets may have little to no stereoscopic 3-D effect applied. Further, each shade of gray within the gradient model may have an associated volume pixel offset. Therefore, the object may have several pixel offsets associated with the pixels of the object corresponding to the many shades of gray within the gradient model. Further, the more shades of gray utilized to acquire the pixel offset map, the more detailed the stereoscopic volume technique may appear when rendered in stereoscopic 3-D.

Returning to FIG. 5, once the gradient model pixel offset and depth pixel offset are determined, the computer system creates a left eye layer and a right eye layer for the object in operation 550. The creation of the paired frames may be similar to operation 160 of FIG. 1. Thus, the left eye layer and the right eye layer has similar content to the extracted 2-D layer, including the objects of the layer, such that the color of each pixel of the created layers remain the same as that of the original 2-D layer. Once created, the computer system may shift the pixels of the left eye and right eye layers by the determined pixel offset in operation 560. As mentioned, the pixel shift for any particular pixel of the object may include both the gradient model pixel offset and the depth pixel offset to provide a volume to the object as well as place the object within the z-axis of the stereoscopic 3-D frame as well as provide a volume to the object. The shift of one or more pixels of an object of a 2-D layer in response to a gray scale template, such as a gradient model, is described in more detail in related patent application Ser. No. 12/571,418 now U.S. Pat. No. 8,351,689.

The operations of the method of FIG. 5 may be performed for any number of gradient models. Several examples of gradient models are illustrated in FIGS. 10-13. FIG. 10 is a diagram of a cube point gradient model 1000 for adding depth and volume to a 2-D image when rendered in stereoscopic 3-D. The cube point gradient model 1000 is a three dimensional cube object with a gray scale bounded by the edges of the cube object. In this embodiment of the cube point gradient model 1000, the center of the cube is whiter in color than the edges of the cube. Between the white center of the cube and the darker outer edges, the gray scale coloring transitions from the white color to the dark color uniformly as the color moves away from the center. This gradient model 1000, as with all gradient models described herein, may be used in the method described in FIG. 5 to adjust the pixel offset of one or more pixels of a layer of a 2-D image. Further, it should be appreciated that the gray scale template may be applied in any manner within the cube point gradient model 1000. For example, the center of the cube may be darker than the edges.

FIG. 11 is a diagram illustrating a quadrangle gradient model example for adding depth and volume to a 2-D image when rendered in stereoscopic 3-D. The quadrangle gradient model 1100 is a three dimensional plane object defined by points A, B, C and D. Further, the quadrangle gradient model 1100 includes a gray scale template bounded by the edges of the plane object. In this embodiment of the quadrangle gradient model 1100, the left side of the plane is whiter in color than the right side of the plane. Between the left side and the right side of the plane, the gray scale template transitions from a white color to a dark color uniformly as the color moves across the plane. In another embodiment, the gray scale template may be darker on the right side and become lighter in color near the right edge of the plane.

FIG. 12 is a diagram illustrating a radial gradient model example for adding depth and/or volume to a 2-D image when rendered in stereoscopic 3-D. The radial gradient model 1200 is a spherical object including a gray scale template bounded by the edges of the sphere object. In this embodiment of the radial gradient model 1200, the center of the sphere is whiter in color than the edges of the sphere. Between the white center and the darker outer edges, the gray scale template transitions from the white color to the dark color uniformly as the color moves away from the center. In an alternate embodiment, the center of the sphere may be darker than the edges.

FIG. 13 is a diagram of a plurality of jointed gradient models for adding depth and/or volume to a 2-D image when rendered in stereoscopic 3-D. The first type 1310 of jointed gradient model illustrated includes a single segment with no associated joint. The first example 1310 of the jointed gradient model takes the general form of a circle 1314 defining the end of the gradient model with a rectangular shape 1312 extending away from the circle shape. It is not a requirement that the ends of the gradient model (1312, 1314) be a circle and rectangle, respectively. Further, a gray scale template is included within the gradient model bounded by the circle 1314 and rectangle 1312 shapes. In the embodiment shown, the circle 1314 of the jointed gradient model is white in color, with the gray scale template transitioning into a dark color as the gray scale template extends away from the circle shape. However, it should be appreciated that the jointed gradient model 1310 may include a gray scale template that takes any coloring scheme.

Several aspects of the first example 1310 of the jointed gradient model may be adjusted to match one or more objects of a 2-D frame. For example, the radius of the circle shape 1314 of the depth gradient 1310 may be adjusted to match an aspect of an object. In the embodiment shown, the width of the rectangle portion 1312 of the jointed gradient model 1310 is the same as the diameter of the circle 1314 portion. However, as the diameter of the circle 1314 is increased or decreased as desired, the width of the rectangle 1312 may or may not vary in response. In an alternate embodiment, the rectangle 1312 takes the form of a quadrangle shape in response to the modification to the radius of the circle 1314, with a first width of the quadrangle matching the diameter of the circle where the two shapes meet and a second width different than the first width at the opposite end of the quadrangle. Generally, any aspect of the shape of the jointed gradient model 1310 may be adjusted to fit the objects of the 2-D frame.

The manipulation of the aspects of the depth model may be performed in a variety of ways. In one embodiment, an artist manually adjusts the depth model through a mouse or other input device to a computer system, such as by pointing and clicking. In another embodiment, the artist adjusts the aspects of the depth model by providing coordinates, such as [x,y] positions for the one or more points of the depth model. In still another embodiment, the shape of the depth model is adjusted automatically by the computer system in response to several aspects of the 2-D frame. As described, the values may vary over time in response to the movement and deformation of the object or layer to which the gradient model is applied.

A second example 1320 is also illustrated that includes a single joint. The single joint embodiment 1320 includes a first segment 1322, a second segment 1324, a first joint 1326 that connects the first segment and the second segment and a circle shape 1328 defining the end of the gradient model. In addition, each of the separate portions of the single joint gradient model 1320 is adjustable. Further, as shown, a gray scale template is included in the gradient model 1320 such that the circle shape 1328 is white in color, with the gray scale template transitioning into a dark color as the gray scale extends away from the circle shape, with the darkest part of the gradient model at the first segment 1322. Again, the gray scale for this embodiment may take any coloring scheme as desired. For example, the circle shape 1328 may be white in color, while the joint shape 1326 may be 75% gray in color and the rectangular end point may be 10% gray in color. The colors in the segments between these two points would transitions along the grayscale in any fashion, such as linearly or exponentially, to the values at the joint or end points.

A third example 1330 is also illustrated that includes two joints. The two joint embodiment 1330 includes a first segment 1332, a second segment 1334 and a third segment 1336. Each of these segments may be connected to another segment through a first joint 1338 or a second joint 1340. Further, the first segment 1332 and the third segment 1336 includes circle shapes 1342, 1344 that define the end of the segments opposite the first and second joints. As with the above examples, the aspects of this embodiment are also adjustable, including the width of each segment, the radius of each joint and the radius of each circle shape.

A gray scale template is also included bounded by the portions of the two joint gradient model 1330. In addition, each of the separate portions of the single joint gradient model 1320 is adjustable. In the embodiment shown, the circle shapes 1342, 1344 are white in color, with the gray scale template transitioning into a dark color as the gray scale template extends away from the circle shapes, with the darkest part of the gradient model along the second segment 1334. Again, the gray scale template for this embodiment may take any coloring scheme as desired.

The embodiments shown in FIG. 13 are just some examples of the types of jointed gradient models that may be created to create a gray scale template from which a pixel offset may be determined for an object of a 2-D frame. It should be appreciated that any number of joints may be used to create the gradient model. Further, the gray scales shown transition uniformly across the shape. However, the gray scale templates may be adjusted or created as desired to achieve a proper stereoscopic 3-D effect for an object. Generally, the jointed gradient models may be utilized to provide a stereoscopic 3-D effect to an object such that the object extends away from the screen or behind the screen from which the stereoscopic 3-D frame is being displayed.

Figure 14:
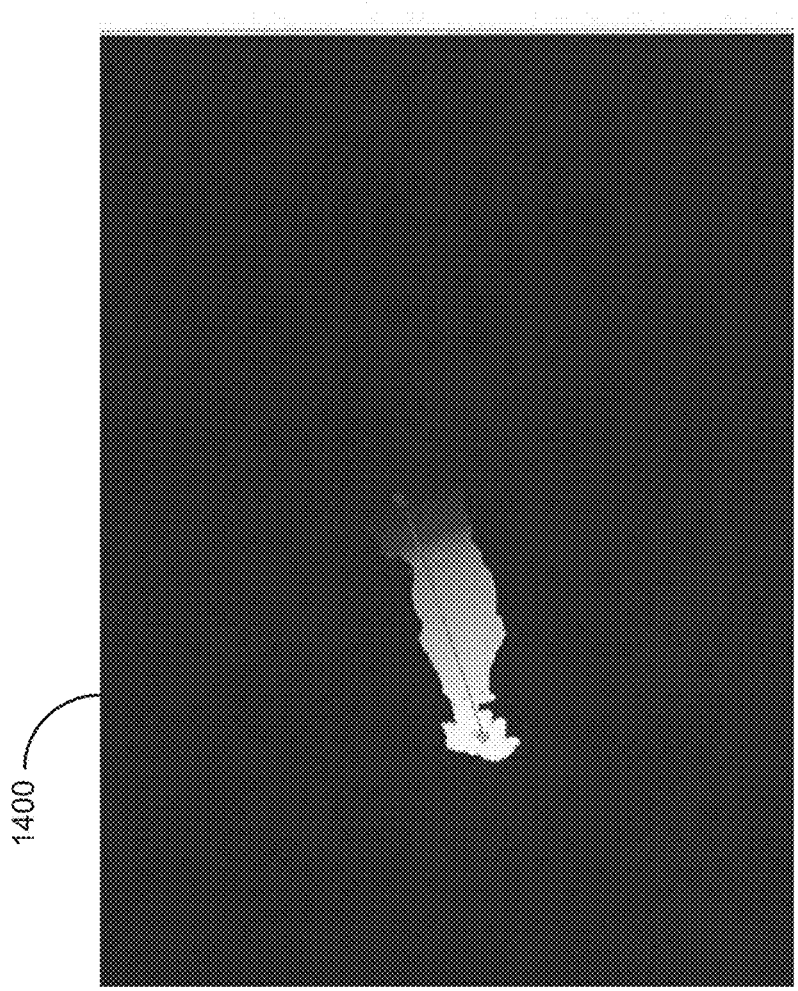
FIG. 14 is a diagram of a jointed gradient model superimposed on a layer of a 2-D image to add depth to the 2-D image when rendered in stereoscopic 3-D.

FIG. 14 is a diagram of a jointed gradient model superimposed on an object of a 2-D frame such that a gray scale template is created that provides several pixel offsets such that the object appears to extend forward from the screen when the layer is rendered in stereoscopic 3-D. The gradient model of FIG. 14 is created by utilizing the first example 1310 of the jointed gradient model shown in FIG. 13.

As shown, the gradient models discussed herein corresponds to an object or layer of a 2-D frame such that the pixels of the gradient model 1400 correspond to one or more pixels of the layer. In this example, the layer includes a character's arm as an object. Thus, the gradient model 1400 comprises pixels that correspond to the object in a one to one fashion. Further, the gradient model 1400 includes a gray scale template with various shades of gray representing a pixel offset to be applied to the object or layer. In particular, the gradient model 1400 provides a gray scale template for the character's arm object such that the character's hand is whiter in color than the rest of the character's arm, with the portion of the arm that attaches to the rest of the character is black or near black.

In this example, the whiter portions of the gray scaled template provide a greater pixel offset to the corresponding pixels of the object than the darker portions. When rendered in stereoscopic 3-D, those portions with a greater pixel offset appear to extend further from the rest of the layer. In one embodiment, the character's arm extends into the foreground while, in another embodiment, the character's arm appears to extend into the background of the stereoscopic 3-D frame. Such a gradient model may be useful in situations where the character is pointing either into the foreground or background. Thus, rather than having the character appear flat, the character's arm appears to actually extend away from the character's body. By creating a gray scale gradient model and adjusting the pixel offset of the pixels of the layer based on the gradient model, a more detailed stereoscopic 3-D effect may be achieved for one or more objects of a 2-D frame.

Figure 15:
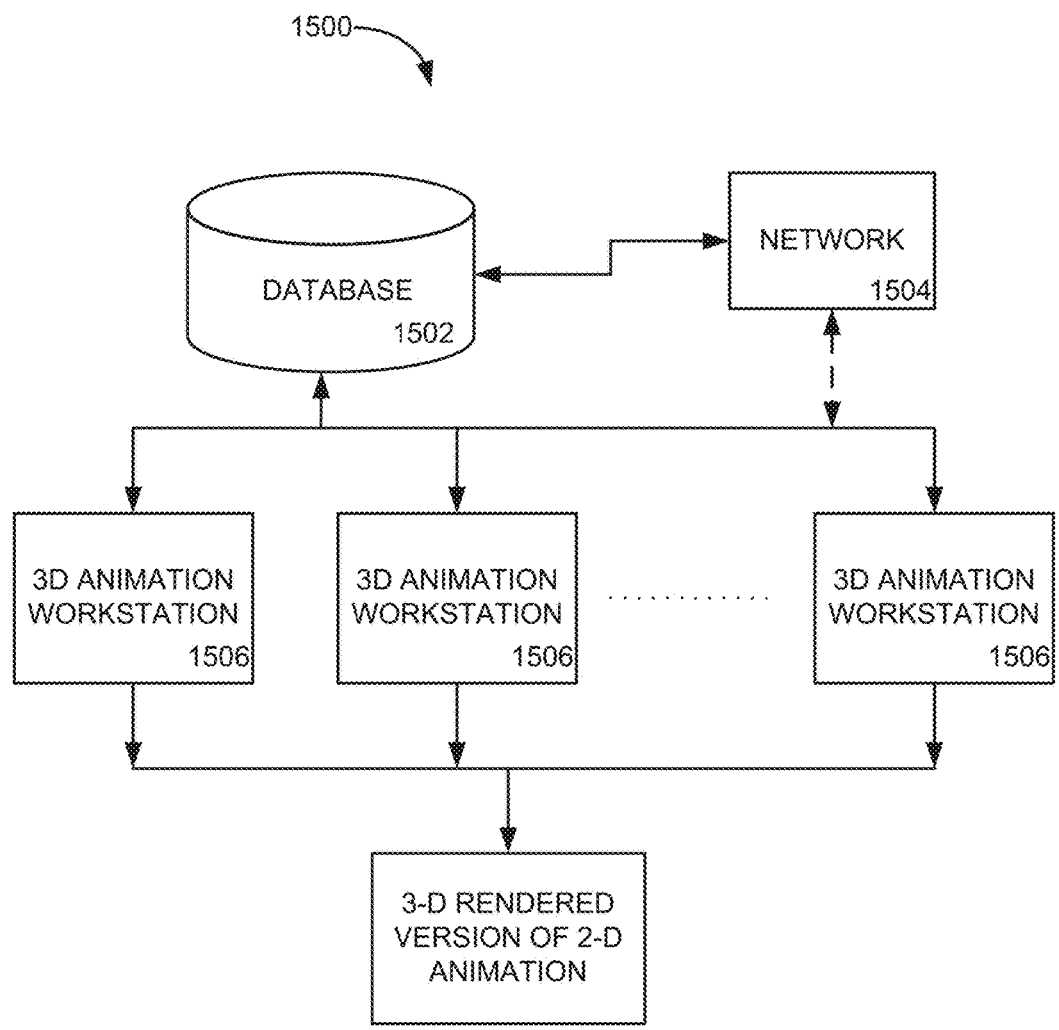
FIG. 15 is a high-level block diagram illustrating a particular system for converting a 2-D image of a multimedia presentation to a stereoscopic 3-D image.

FIG. 15 is a high-level block diagram illustrating a particular system 1500 for converting a 2-D image of a multimedia presentation to a stereoscopic 3-D image. The system described below may perform one or more of the operations described above with reference to FIGS. 1 and 5.

The system 1500 includes a database 1502 to store one or more scanned or digitally created layers for each image of the multimedia presentation. In one embodiment, the database 1502 may be sufficiently large to store the many layers of an animated feature film. Generally, however, the database 1502 may be any machine readable medium. A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory. Common forms of machine-readable medium may include, but are not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Alternatively, the layers of the 2-D images may be stored on a network 1504 that is accessible by the database 1502 through a network connection. The network 1504 may comprise one or more servers, routers and databases, among other components to store the image layers and provide access to such layers. Other embodiments may remove the database from the system 1500 and extract the various layers from the 2-D image directly by utilizing the one or more computing systems.

The system 1500 also include one or more computing systems 1506 to perform the various operations to convert the 2-D images of the multimedia presentation to stereoscopic 3-D images. Such computing systems 1506 may include workstations, personal computers, or any type of computing device, including a combination therein. Such computer systems 1506 include several computing components, including but not limited to, one or more processors, memory components, I/O interfaces, network connections and display devices. Memory and machine-readable mediums of the computing systems 1506 may be used for storing information and instructions to be executed by the processors. Memory also may be used for storing temporary variables or other intermediate information during execution of instructions by the processors of the computing systems 1506. In addition, the computing systems 1506 may be associated with the database 1502 to access the stored image layers. In an alternate embodiment, the computing systems 1506 may also be connected to the network through a network connection to access the stored layers. The system set forth in FIG. 15 is but one possible example of a computer system that may employ or be configured in accordance with aspects of the present disclosure.

It should be noted that the flowcharts of FIGS. 1 and 5 are illustrative only. Alternative embodiments of the present invention may add operations, omit operations, or change the order of operations without affecting the spirit and scope of the present invention.

Parallax Based Monoscopic Rendering Using 3-D Image Pairs

Embodiments for using the created left and right eye images created above using the techniques discussed with respect to FIGS. 1-5 to create a dynamic 3-D experience on a 2-D display will now be discussed. The embodiments discussed herein may use the parallax or 3-D data defined or otherwise created using the techniques as described above to create one or more viewpoint images. The viewpoint images are images of a particular frame that are captured at viewpoints between viewpoints of an initial stereoscopic pair for that frame. For example, if the left eye image of the stereoscopic pair corresponds to a first viewing location and the right eye image of the stereoscopic pair corresponds to a second viewing location, the new viewpoint images may correspond to images at a plurality of viewpoint locations between or outside of the first and second viewpoint locations. The viewpoint images may then be displayed sequentially or individually to provide a user with a 3-D experience on a 2-D screen. Exemplary devices for display and/or rendering the viewpoint images will be discussed first and then the methods used by the devices to provide the 3-D experience on a monoscopic display will be discussed.

Figure 16A:
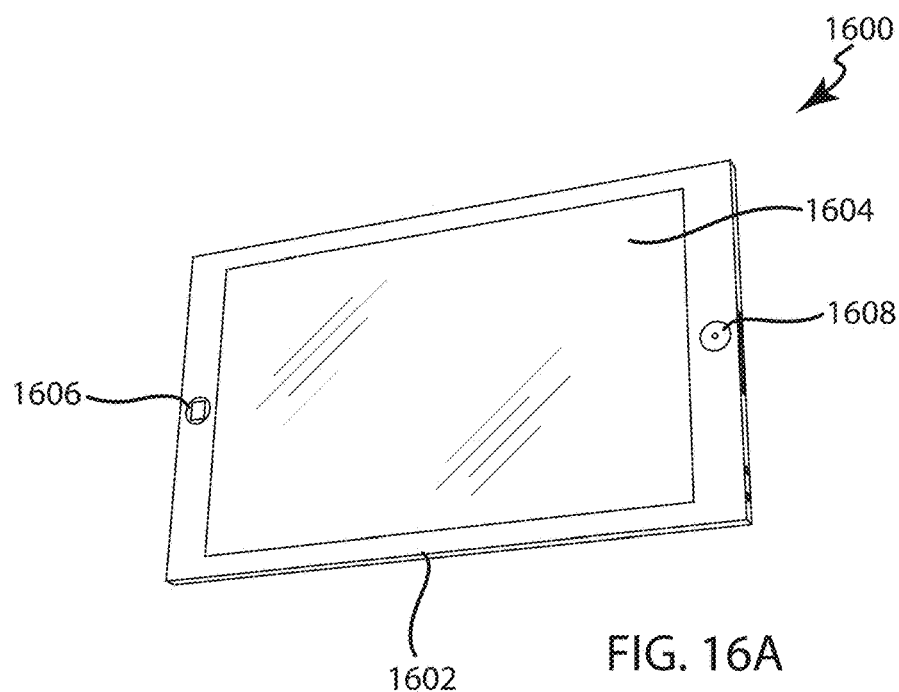
FIG. 16A is a top plan view of a system for monoscopic rendering of 3-D images.
Figure 16B:
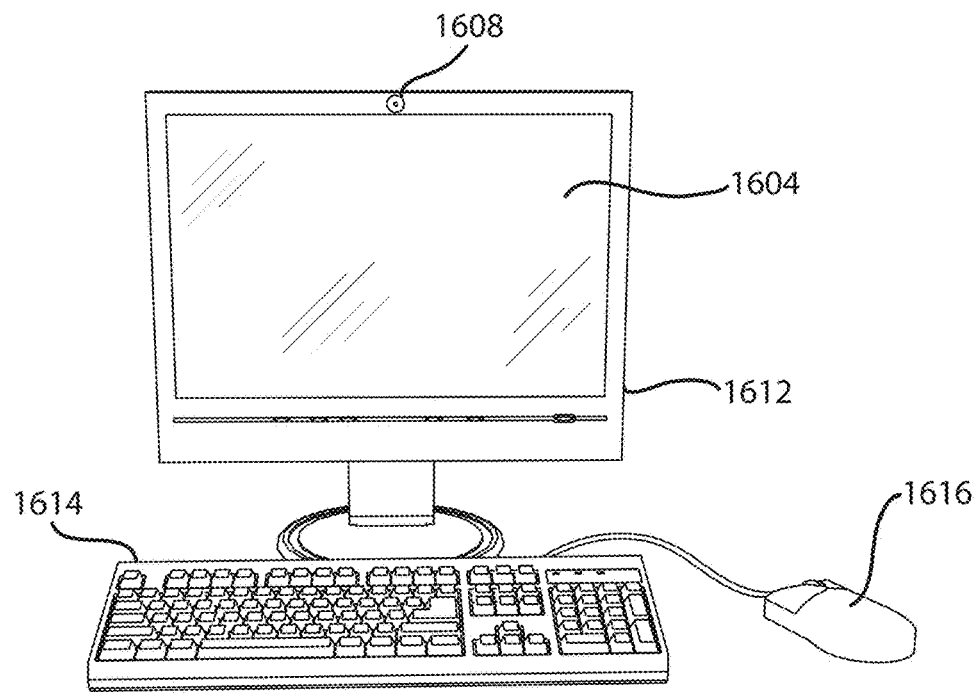
FIG. 16B is a perspective view of another example of the system of FIG. 16A.
Figure 17:
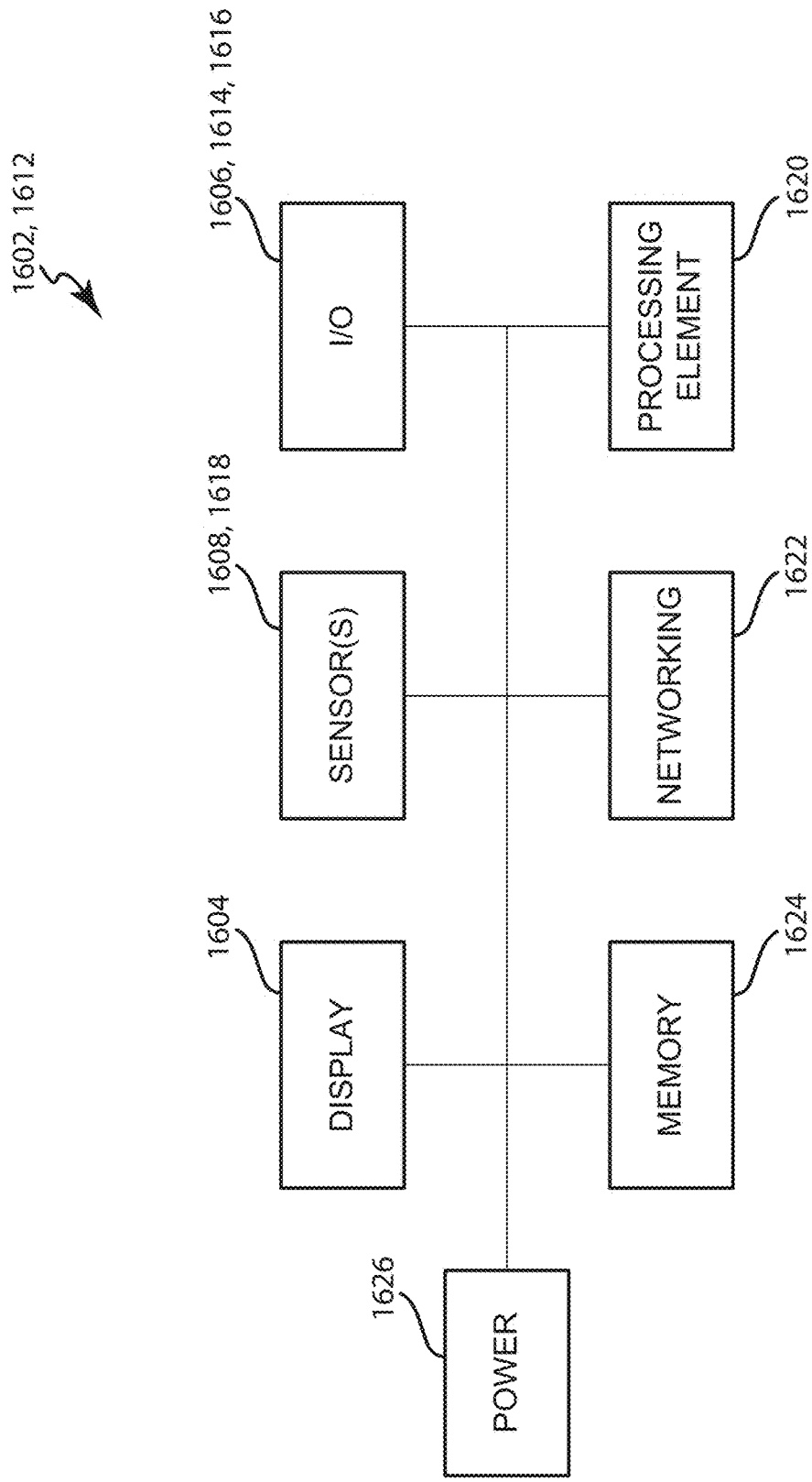
FIG. 17 is a simplified block diagram of the computing devices shown in FIGS. 16A and 16B.

FIGS. 16A and 16B illustrate exemplary systems for monoscopic rendering of 3-D images. FIG. 17 is a simplified block diagram of the computing devices shown in FIGS. 16A and 16B. With reference to FIGS. 16A-17, the system 1600 may include a computing device 1602 including or in communication with a display 1604. The computing device 1602 and display 1604 are used to display 2-D images, such as the left and right stereo pairs 420, 430 of FIG. 4. Generally, the display may display each image within the image pair and the viewpoint images separately, rather than simultaneously. As shown in FIG. 16A, the computing device 1602 is a tablet computer. However, many other types of computing devices may be used. For example, the computing device 1612 shown in FIG. 16B is a desktop computer. Other examples of computing devices include a smart phone, mobile gaming device, set top box, wearable electronic devices, televisions, and the like.

The computing devices 1602, 1612 may also include a display 1604, one or more processing elements 1620, a networking or communication interface 1622, memory components 1624, a power source 1626, one or more sensors 1608, 1618, and one or more input/output (I/O) devices 1606, 1614, 1616. Each of the these components will be discussed in turn below.

The display 1604 provides a visual output for the computing device 1602. For example. In some embodiments, the display 1604 may be a liquid crystal display screen, plasma screen, light emitting diode screen, and so on. The display 1604 may also function as an input device in addition to displaying output for the computing device 1602. For example, the display 1604 may include capacitive touch sensors, infrared touch sensors, or the like, that may capture a user's input to the display 1604. Additionally, although the display 1604 is shown as being integrated with the computing device 1602, in other embodiments the display 1604 may be separate from the computing device 1602, 1612, such as a standalone monitor or the like. It should be noted that in many embodiments the display 1604 may be a monoscopic or 2-D display that is configured to display 2-D images. However, in other embodiments, the display 1604 may be a stereoscopic display that can display the stereo pair images simultaneously.

The processing element 1620 may be substantially any type of electronic device capable of processing, receiving, and/or transmitting instructions. For example, the processing element 1620 may be a microprocessor or a microcomputer. Additionally, the processing element 1620 may include one or more processors. For example, select components of the computing device 1602 may be controlled by a first processing element, and other components of the computing device 1602 may be controlled by a second processing element, where the first and second processing elements may or may not be in communication with one another. The one or more processing elements 1620 may be specialized for select tasks, e.g., a graphics processing unit, or may be more generalized, e.g., central processing unit. The discussion of any particular task being executed by the one or more processing elements herein may be completed by one processing element or a combination of processing elements.

The memory components 1624 of the computing device 1602 are used to store electronic data that can be utilized by the computing device 1602. For example, the memory 1624 may store electrical data or content, e.g., image files, video files, audio files, document files, and so on, corresponding to various applications. The memory 1624 may be, for example, non-volatile storage, a magnetic storage medium, optical storage medium, magneto-optical storage medium, read only memory, random-access memory, erasable programmable memory, flash memory, or a combination or one or more types of memory components.

The network/communication interface 1622 provides communication to and from the computing device 1602. For example, the network/communication interface 1622 may transmit data to other computing devices through a wireless network (WiFi, Bluetooth) or a wired network (Ethernet).

The power source 1626 provides power to the various components of the computing device 1602. The power source 1626 may include one or more rechargeable, disposable, or hardwired sources, e.g., batteries, power cord, or the like. Additionally, the power source 1626 may include multiple types of connections or components that provide different types of power to the device 1602.

The computing device 1602 may further include one or more sensors 1608, 1618. The sensors 1608, 1618 sense one or more characteristics of a user input and/or external/internal parameters of the computing device 1602. For example, the sensors 1608, 1618 may include accelerometers, gyroscopes, light sensors, image sensors (e.g., cameras), force sensors, capacitive sensors, or the like. In many embodiments, the sensors 1608, 1618 are used to detect a user input to the computing device 1602 that may be analyzed to determine a visual output on the display 1604. For example, the sensors 1608, 1618 may include an image sensor that captures data about the user and can be used to track the user's eyes or focus, movement of the user's head, or the like. In another example, the sensors 1608, 1618 may be used to detect movements of the computing device 1602 caused by the user, e.g., rocking, tilting, or the like.

In embodiments where two or more sensors are used, the sensors may act jointly or otherwise be evaluated together in order to determine a user input. For example, the user may provide a touch input to the display 1604 and at the same time rock the computing device 1602 in a first direction. In this example, the sensors 1608, 1618 may be configured to detect both the input to the display and the movement input and the combined input may be used as the user input to the device.

In addition to the sensors 1608, 1618, the computing device 1602 may also include one or more I/O devices 1606, 1614, 1616. The I/O devices 1606, 1614, 1616 provide a user the ability to directly input data to the computing device 1602. Examples of I/O devices 1606, 1614, 1616, include but are not limited to, a keyboard 1614, a mouse 1616, an input button 1606, a stylus, a touch screen display, and so on.

It should be noted that the computing devices and components illustrated in FIGS. 16A-17 are meant as illustrative only and many other types of computing devices and electronic devices are envisioned to be used.

The computing device 1602 and/or the 3-D animation workstation 1506 may be used to analyze stereo pairs created as described above in FIGS. 1-5 to create additional viewpoint images. For discussion purposes, the computing device 1602 will be discussed as creating and displaying the additional viewpoint images, but it should be noted that either the 3-D animation workstation 1506 or one or more other computing devices may be used and the created images may then be transmitted or otherwise communicated to the computing device 1602 or to another electronic device for display.

Figure 18A:
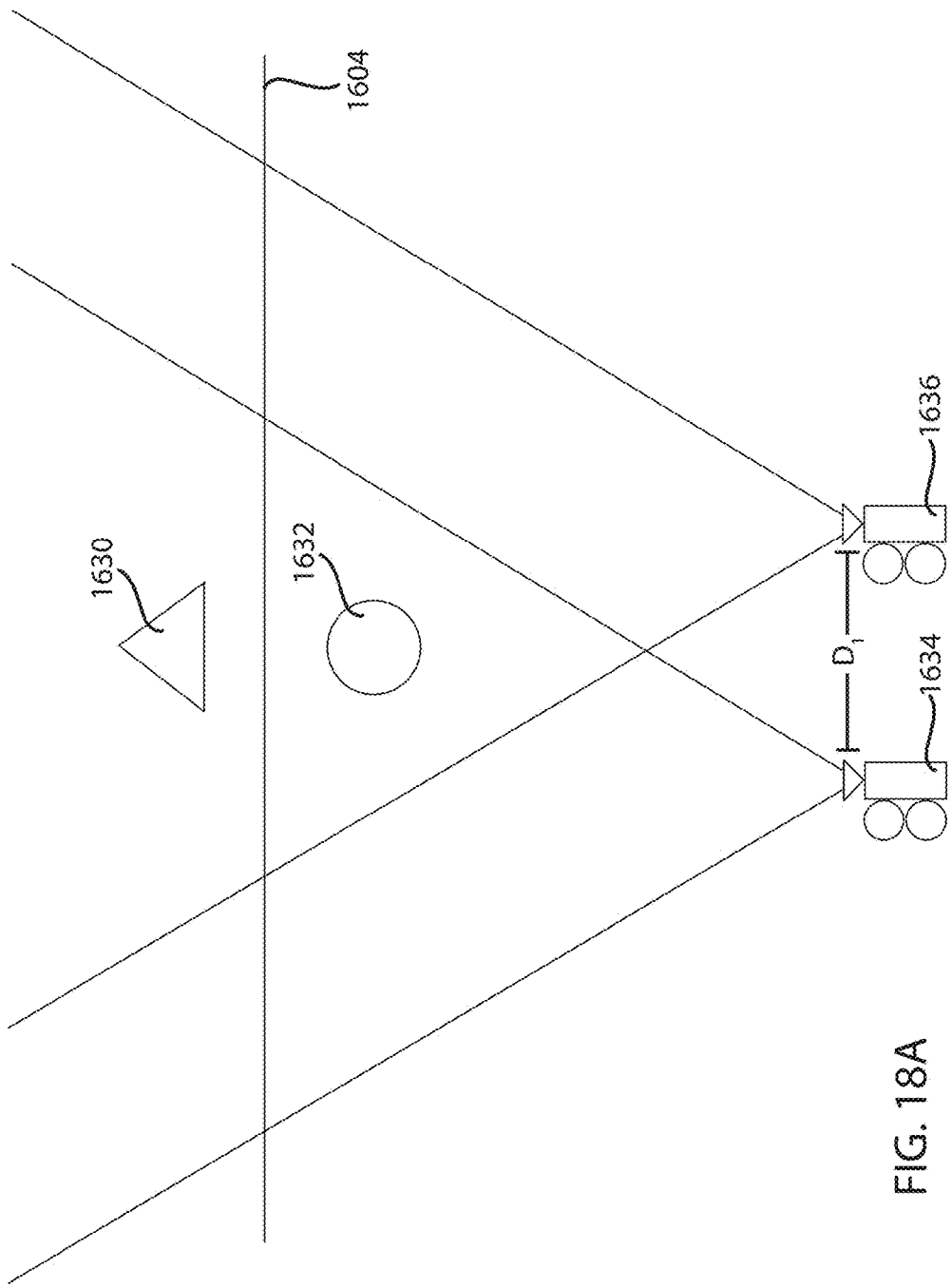
FIG. 18A is a top plan view of a simulated projection of a left image and a right image on a screen.
Figure 18B:
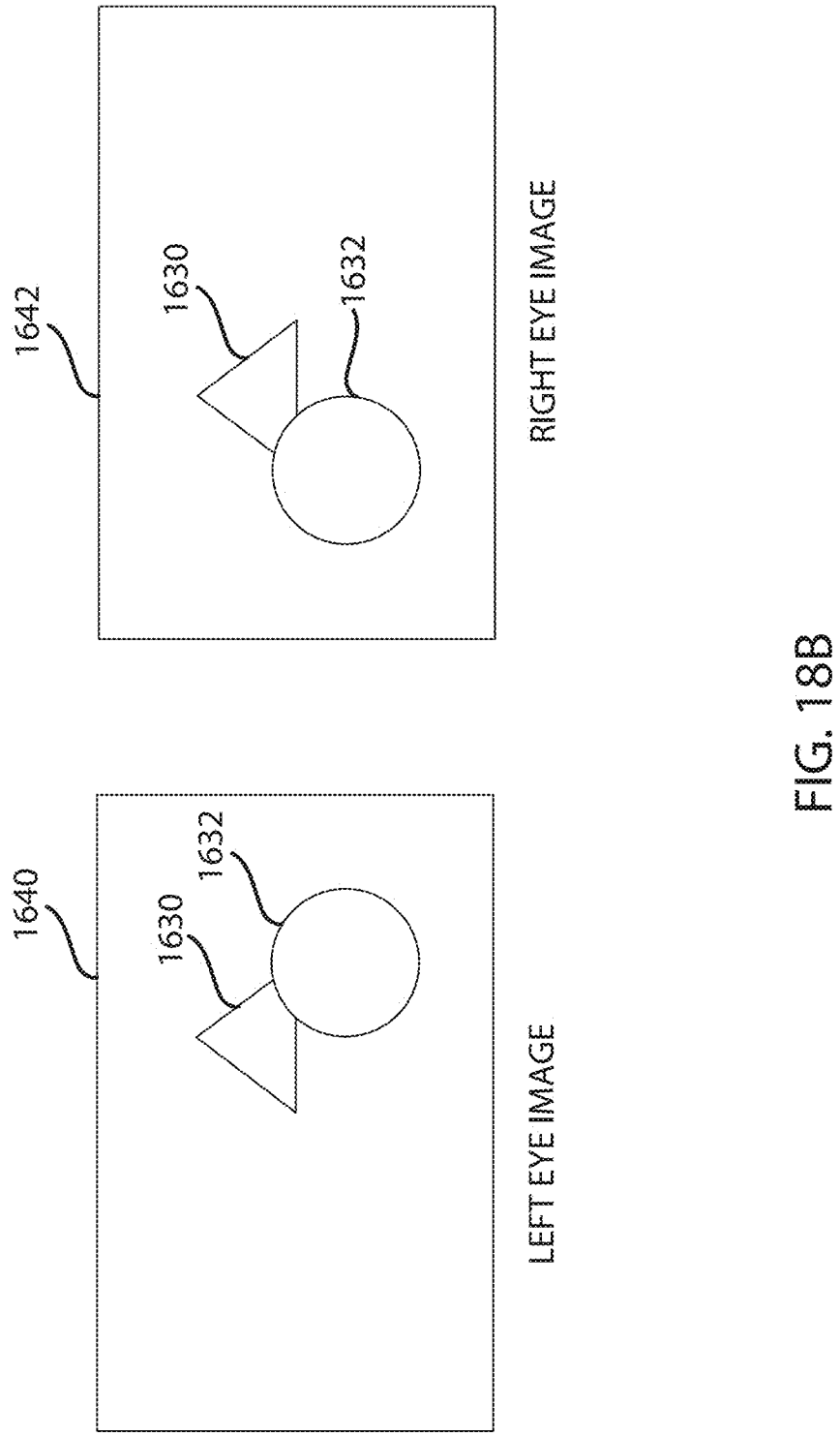
FIG. 18B illustrates a stereo image pair created using the methods of FIGS. 1 and 5.

FIG. 18A is a top plan view of a simulated projection of a left image and a right image on a screen. FIG. 18B illustrates a stereo image pair 1640, 1642 created using the methods of FIGS. 1 and 5. With reference to FIGS. 18A and 18B, a left eye image 1640 and a right eye image 1642 each include a foreground object 1632 and a background 1630 object. The foreground object 1632 and background object 1630 are located in a different region on the left eye image 1640 as compared to the right eye image 1642. As discussed above with respect to FIG. 4, this pixel offset determines the depth and volume appearance for the two objects 1630,

1632. With reference to FIGS. 18A, the pixel offset may be defined as a separation distance D1 between two camera or projector 1634, 1636 locations as they project onto a screen. It should be noted that the cameras may be virtual cameras in a computer graphics environment that determine the viewpoint for the left eye image and the right image, respectively. As such, the camera locations may be correlated to viewpoint locations that are used to determine the viewpoint of displayed images.

The separation distance between the left eye image 1640 and the right eye image 1642 allows the foreground object 1632 to appear as though it is in front of the display 1604, and the background object 1630 to appear as though it is behind the display 1604 plane when a user views both images 1630, 1632 simultaneously or substantially simultaneously (with the left eye image 1640 only being viewed by the left eye of a viewer, and the right eye image 1642 only being viewed by the right eye of a viewer, e.g., through polarized glasses, lenticular lenses, autostereoscopy display, or the like). However, for a viewer without specialized glasses on a monoscopic display, the output of the display of the left eye image 1640 and the right eye image 1642 will appear blurry, since the two images are displayed simultaneously, and the left and right eyes of the viewer are exposed to both images simultaneously. That is, the objects 1630, 1632 will not appear to have a depth or a volume, but will appear as flat and blurry objects.

Figure 19:
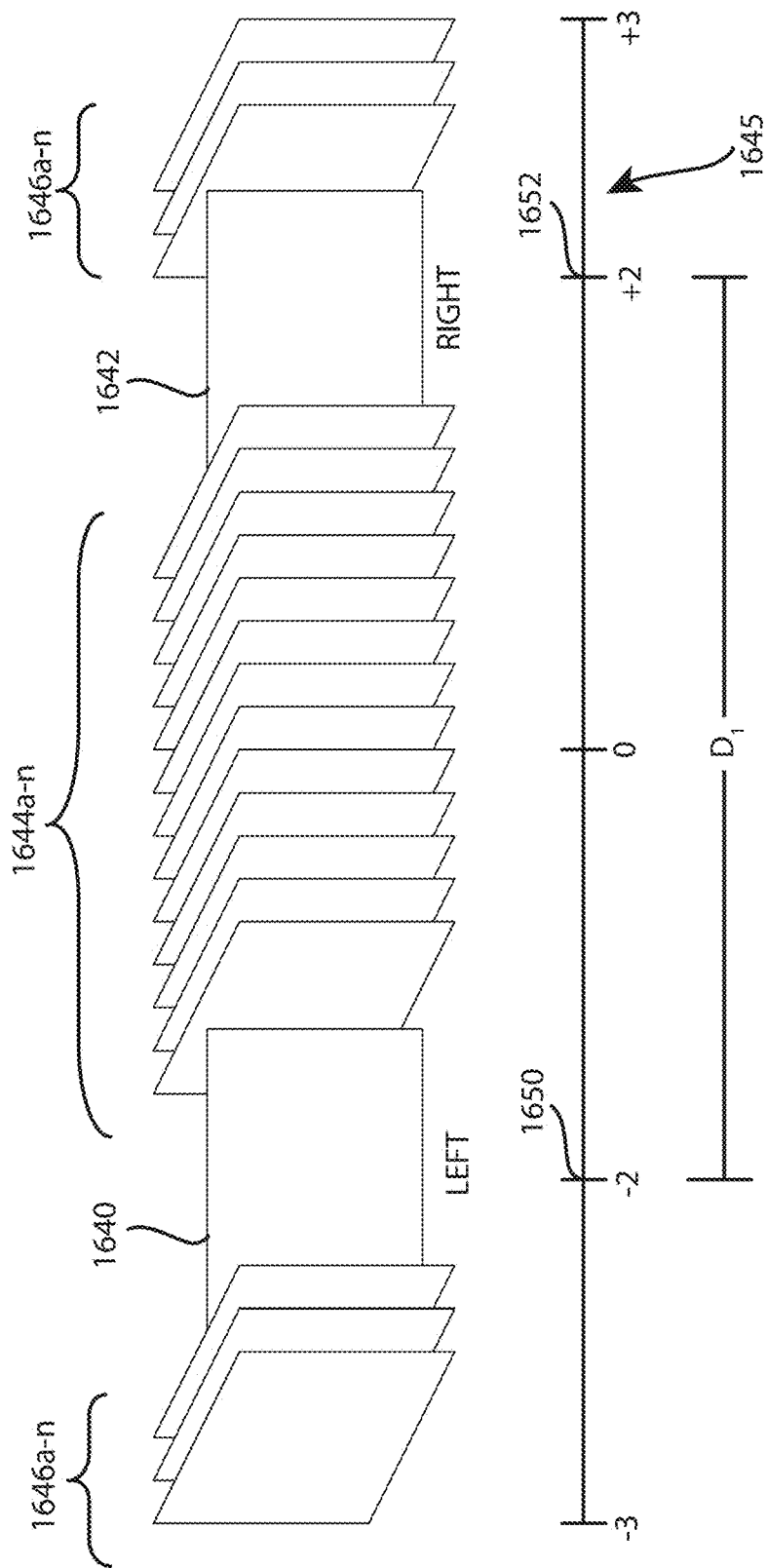
FIG. 19 is a diagram illustrating intermediate and exterior viewpoint images across a depth spectrum.

To allow a viewer of a monoscopic display to view the content of the images 1640, 1642 without using specialized components, such as polarized glasses or lenticular lenses, the system 1600 provides images that fall between the viewpoints of the left and right images 1640, 1642 and may then display those viewpoint images separately and sequentially. FIG. 19 is a diagram illustrating intermediate and exterior viewpoint images across a depth spectrum. With reference to FIG. 19, as will be discussed in more detail below, the computing device 1602 may analyze the viewpoint locations of the left eye image 1640 and the right eye image 1642, such as the original projector 1634, 1636 positions used to create those images, to determine one or more intermediate and/or exterior viewpoint images. In one example, the computing device may use the inflation or volume data, the spatial or depth data, and the camera position corresponding to the volume and depth data to determine the viewpoint point images.

In one embodiment, the computing device 1602 may interpolate and/or extrapolate viewpoints along a depth spectrum 1645. In this example, the left eye image 1640 may be set at a first perspective location 1650, and the right eye image 1642 may be set at a second perspective location 1652. In this example, the distance between the first perspective location 1650 and the second perspective location 1652 is the interocular distance. This distance D1 is typically used by the methods of FIGS. 1-5 to determine the pixel offset for pixels within an image and corresponds to the average distance between the centers of a viewer's pupils. The first perspective location 1650 and the second perspective location 1652 generally correspond to the locations of the first camera 1634 and the second camera 1636, respectively. In other words, the first and second perspective locations determine the location of the cameras 1634, 1636. It should be noted that the first and second perspective locations 1650, 1652 may be provided as inputs to the method of FIG. 1, such as in operation 160, to create the stereoscopic image pair. For example, as the perspective locations may correspond to the pixel offset for the images, that includes the layer depth value and inflation values, the perspective locations represent the offset location of the images that results in a desired depth layer pixel offset and the object inflation or volume offset.

The computing device 1602 may then assign numbers, coordinates, indices, or substantially any other parametric form to perspective locations 1650, 1652 for stereo image pair 1640, 1642. The coordinates, such as numbers, assigned to each of the perspective locations 1650, 1652 represents the relative relationship between the left eye image and the right eye image. It should be noted that in the following examples, a number is used as the parametric element used to designate the relationship between the left eye image and the right eye image. However, it should be noted that many other forms are envisioned and the below numeric examples are meant as illustrative only. For example, after assigning the first perspective location 1650 and the second perspective location 1652 a number, the computing device 1602 interpolates between the two locations 1650, 1652 to determine a plurality of intermediate viewpoint locations.

Once the viewpoint locations have been determined, the computing device generates intermediate viewpoint images 1644a-1644n. The intermediate viewpoint images 1644a-1644n are images at viewpoints or perspectives positioned between the two perspective locations 1650, 1652. As one example, the computing device 1602 constructs new images at new viewpoints using the methods described above with respect to FIGS. 1-5 to generate the known left eye image 1640, right eye image 1642. In this example, the method of FIG. 1 may be re-executed with the newly modified inputs (e.g., the viewpoint locations determining the desired pixel offset). As another example, the computing device 1602 may generate the intermediate viewpoint images by using the known images 1640, 1642 themselves as inputs, or may use a combination of the images themselves, along with parametric, gradient, and/or other data used to generate the original stereo pair 1640, 1642. The method for creating the intermediate viewpoint images once the viewpoint locations have been determined may be varied based on the features of the system and/or user preferences.

In one example, the first perspective location 1650 is at −2 and the second perspective location 1652 is at +2. In this example, intermediate viewpoint images 1644a-1644n are set as images at viewpoint locations anywhere between −2 and +2, e.g., −1 and +1 or −0.5 and +0.5. The range and number of viewpoint images created by the computing device 1602 may be defined by the viewer, the system, or by the content being analyzed.

In addition to interpolating images, the computing device 1202 may also extrapolate exterior viewpoint images 1646a-1646n. The exterior viewpoint images 1646a-1646n are viewpoints that are defined at perspective locations outside of the pixel offset distance D1 (e.g., outside of the range between the first perspective location 1650 and the second perspective location 1652). In creating the exterior viewpoint images 1646a-1646n, the computing device determines one or more locations that fall outside of the perspective locations of the left and right eye images 1640, 1642, i.e., exterior viewpoint locations. Once the exterior viewpoint locations are determined, the computing device may re-execute the methods described above with respect to FIGS. 1 and 5 and/or may the original left and right eye images 1640, 1642 themselves to generate new exterior viewpoint images 1646a-1646n. In some instances, the exterior images may have artifacts as compared to the left and right eye images or the interior images as the extrapolated viewpoint locations may push the limits of the methods of FIGS. 1-5 beyond what is determined acceptable for the original left and right eye images 1640, 1642. On the other hand as, the intermediate viewpoint locations are contained within the boundaries of the original left and right eye image locations and so artifacts are not a concern for those images.

It should be noted that although the viewpoint images are illustrated as being taken across various lateral locations along the frame, the viewpoints may be taken along substantially any axis. For example, the viewpoints may be interpolated along a vertical axis and/or combinations of axes (e.g., diagonal, and/or forward-center-back combinations). In short, the interpolation may be varied based on the desired output images.

Figure 20A:
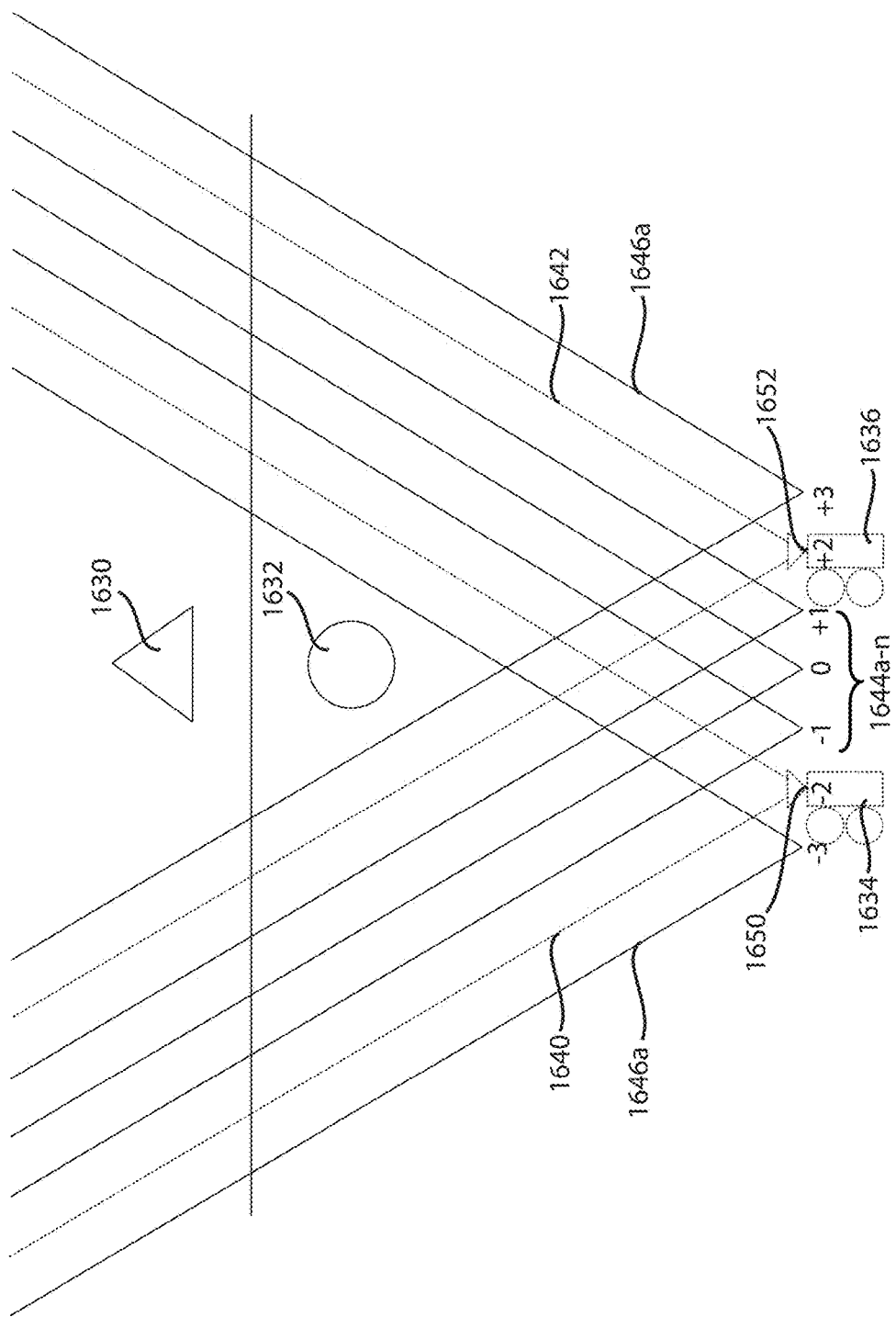
FIG. 20A is a schematic of a top plan view of the plurality of intermediate and exterior viewpoints determined by the computing device.
Figure 20B:
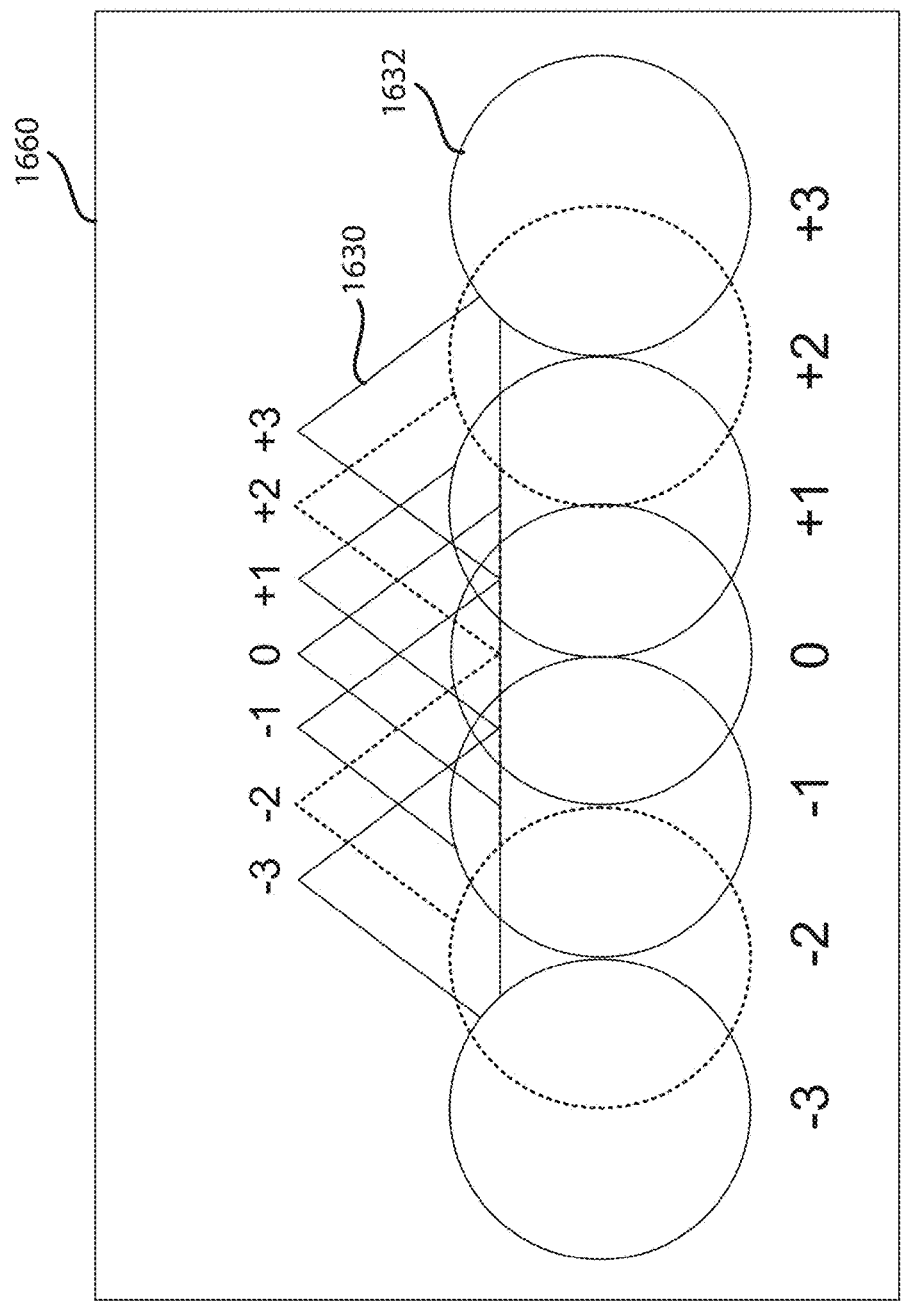
FIG. 20B illustrates a collage image demonstrating the relative position of objects of the image frame as they appear in each intermediate and exterior image.

FIG. 20A illustrates a schematic of a top plan view of the plurality of intermediate and exterior viewpoints determined by the computing device 1602. FIG. 20B illustrates a collage image 1660 demonstrating the relative position of the foreground object 1632 and the background object 1630 as they appear in each intermediate and exterior image. With reference to FIG. 20A, the first perspective location 1650 and the second perspective location 1652 are shown in dashed lines. In FIG. 20B the objects 1630, 1632 of the left and right eye images 1640, 1642 as they are viewed in FIG. 20A are also dashed. As shown in FIG. 20B, both objects 1630, 1632 appear in slightly different locations on the frame collage image 1660 based on the viewpoint location. This is because the viewpoint of the objects 1630, 1632 has changed, which affects the characteristics of the location as viewed by the viewer. For example, the foreground object 1632 may appear further to the left or the right on the frame image 1660 based on the viewpoint that it is a viewed from. Similarly, the background object 1630 also moves across the frame image 1660 based on the viewpoint. In other words, the position of the objects 1630, 1632 on the frame image 1660 depends on the viewpoint that they are observed from, e.g., the location of the cameras 1634, 1636.

As the computing device 1602 determines the plurality of intermediate and exterior viewpoints, the computing device 1602 also determines data corresponding to the location of the objects 1630, 1632 based on the new viewpoint, as well as additional object and other scene characteristics that may vary based on viewpoint. For example, a background scene in which the objects are placed may include different features that are visible only at select viewpoints or that otherwise change as the viewing position changes. In these instances, the computing device 1602 will determine the new data for the newly visible pixels based on the viewpoint of the viewer for both the objects 1630, 1632 as well as other elements within the scene. For example, the computing device 1602 may analyze adjacent pixels to the newly visible pixels to determine the color scheme for the select pixels.

In one embodiment, the computing device may generate the intermediate viewpoint images using the same techniques used to create the left and right eye images, but using the intermediate or exterior viewpoints as inputs. In this example, the viewpoint images may be rendered by using data used to create the original left and right eye images, but provides a different result, since the viewing locations are the intermediate or exterior viewpoint locations. It should be noted that each of the new viewpoint images will show and/or hide pixels differently from each other and from the original left and right eye images, since they will each be captured at a different viewpoint location. In another embodiment, the computing device may generate the intermediate viewpoint images by analyzing the left and right eye images themselves, rather than repeating the processes used to create with the left and right eye images with the originally provided content.

It should be noted that in the example shown in FIGS. 20A and 20B, the parametric form used is numbers and in this example the depth or perspective spectrum varies from −3 to +3, however any other spectrum may be used, and the numbers illustrated are for explanation only and not meant as limiting.

Figure 21:
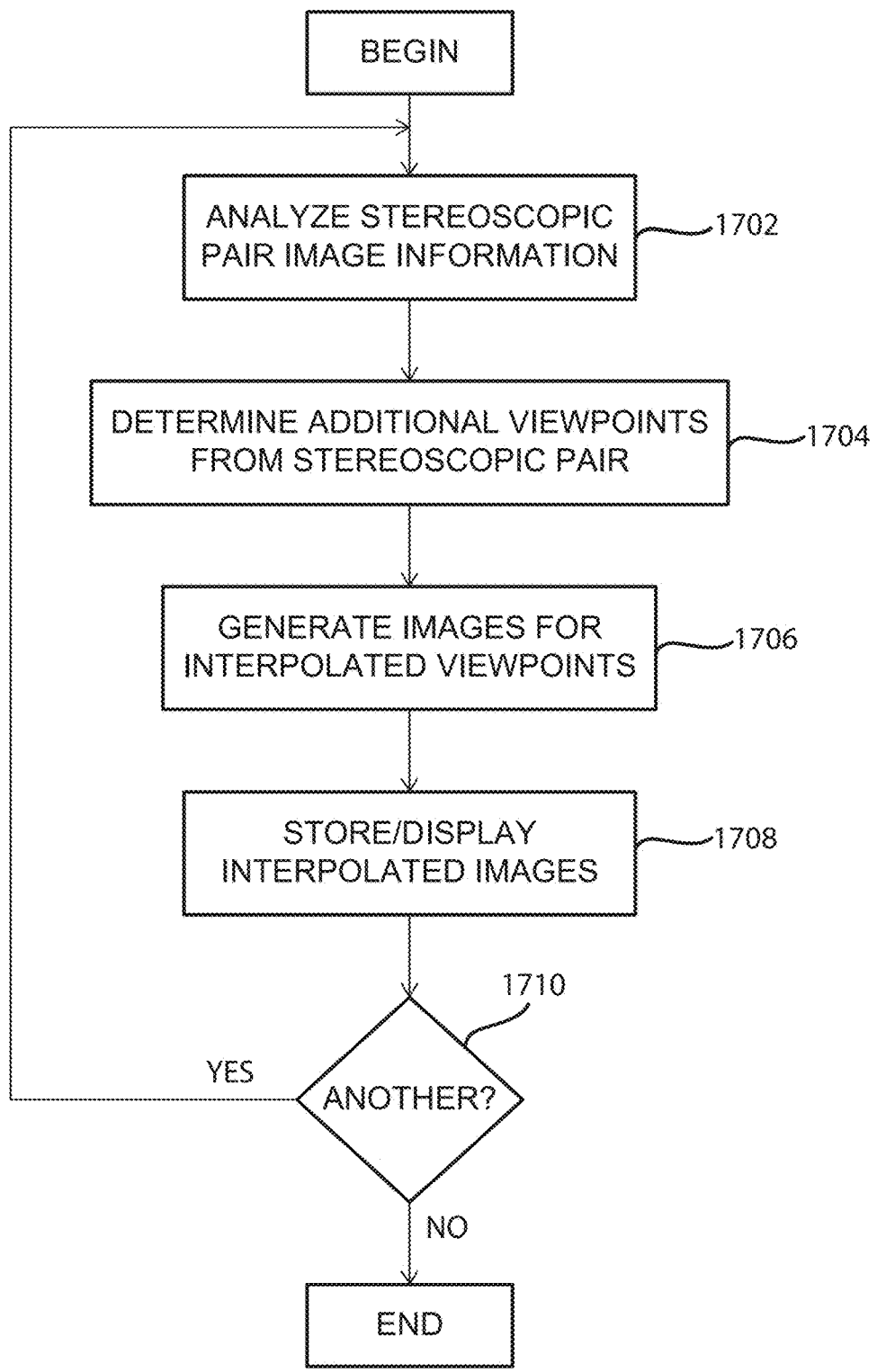
FIG. 21 is a flow chart illustrating a method for using stereo image pairs for 3-D viewing to generate additional images correlating to various viewpoints that can be used for 2-D viewing.

A method for using the stereo pairs generated by the method illustrated in FIGS. 1-5 to create additional viewpoint images will now be discussed. FIG. 21 is a flow chart illustrating a method for using stereo image pairs for 3-D viewing to generate additional images correlating to various viewpoints that can be used for 2-D viewing. With reference to FIG. 21, the method 1700 may begin with operation 1702. In operation 1702, the processing element 1620 of the computing device 1602 analyzes the stereoscopic image pair information. For example, the processing element 1620 determines the pixel offset for each pixel within the image pairs 1640, 1642. The processing element may analyze inputs to the methods of FIGS. 1-5 to determine the viewpoint locations for the stereoscopic image pair 1640, 1642 or may analyze the images themselves to determine the viewpoint location and/or the depth pixel offset value and the volume or inflation value. For example, the processing element may determine the location of the camera 1634, 1636 or another predetermined viewing location used to generate the original image pairs 1640, 1642 and may evaluate the volume induced in objects within the original image pairs such as due to warping and/or gradients applied to objects within the frame (e.g., the methods shown and described with respect to FIGS. 6-14).

It should be noted that the stereoscopic image pairs may be previously generated using the methods as described above with respect to FIGS. 1-5, may be created using an array of cameras in a computer graphic scene, or through using another depth rendering technique. As such, although the discussion is related to using the image data pair created using the stereoscopic pair techniques above, any other techniques may be used. That said, by using the techniques of FIGS. 1-5, the images may include an induced volume effect, in addition to the depth effect, when displayed which provides a more realistic 3-D experience for the user. Additionally, in some embodiments, the method of FIG. 21 may be used without having previously generated left and right eye images, but rather just determining the viewpoints for a stereoscopic image pair and then determining the intermediate viewpoints based on the locations, without requiring the left and right eye images to be generated.

With continued reference to FIG. 21, once the processing element 1620 has determined the viewpoint locations for the stereoscopic image pair the method 1700 may proceed to operation 1704. In operation 1704, the processing element 1620 determines additional viewpoints from the viewpoint locations of the stereoscopic image pair. In other words, the processing element 1620 determines potential viewpoints ranging between or outside of the viewpoint of the stereoscopic image pair 1640, 1642. In one example, the processing element 1620 may assign a first position location to the left eye image 1640 and a second position location to the right eye image 1642 and then interpolate between the two position locations 1650, 1652 to determine viewpoint positions that fall between the two locations 1650, 1652. In another example, the processing element 1620 may extrapolate viewpoint positions that extend outside of the range of the two locations 1650, 1652. In short, the processing element 1620 assigns estimated values of viewpoints based on the first position location 1650 and the second position location 1652.

Once the processing element 1620 has determined the additional viewpoints, the method 1700 may proceed to operation 1706. In operation 1706, the processing element 1620 generates images for each of the interpolated viewpoints. In one example, the processing element 1620 creates images by using the methods of FIGS. 1 and 5 to generate new images from the original 2-D frame, but with the new viewpoint locations used as the input data for the methods. In another example, the processing element 1620 may create the images by interpolating pixel data for each pixel in the viewpoint images 1644a-1644n, 1646a-1646n. This may be done by analyzing the corresponding pixels in the left and right images 1640, 1642 as well as pixels adjacent to or surrounding the respective pixel.

In some instances, each of the viewpoint images may be generated individually. However, in other instances, each of the viewpoint images may be generated simultaneously, depending on the functionalities and features of the system used.

Once the viewpoint images 1644a-1644n, 1646a-1646n have been generated by the processing element 1620, the method 1700 may proceed to operation 1708. In operation 1708 the viewpoint images 1644a-1644n, 1646a-1646n may be stored in the memory component 1624 and/or displayed on the display 1604. In one embodiment, the viewpoint images 1644a-1644n, 1646a-1646n are generated and then stored in the memory component 1624, which allows the viewpoint images to be displayed when desired and/or transmitted via the networking interface 1622 to one or more computing devices. In another embodiment, one or more viewpoint images 1644a-1644n, 1646a-1646n may be generated dynamically by the processing element 1620. After generation, the images may be displayed by the display 1604. For example, as a particular viewpoint image is to be displayed, the processing element 1602 generates the image and then provides the data for the image to the display 1604 which displays the image. In yet another embodiment, the viewpoint images 1644a-1644n, 1646a-1646n may be displayed and stored in operation 1708, e.g., as the viewpoint image is displayed on the display 1604, it is also being stored in the memory component 1624.

After operation 1708, the method 1700 may proceed to operation 1710. In operation 1710, the processing element 1602 determines whether one or more additional viewpoint images should be generated based on another frame and/or the same frame of the content. For example, the method 1700 may be completed for a first frame of an animation sequence, such that the viewpoint images created correspond to the first frame and then the method 1700 may be repeated for a second frame of the animation sequence to create additional viewpoint images for that frame. The processing element 1620 may analyze a user input (e.g., a user selection) or may analyze the content itself to determine if more viewpoint images should be created. For example, the processing element 1620 may create viewpoint images for each frame of the content until viewpoint images have been created for every frame.

If another set of viewpoint images is to be created, the method 1700 returns to operation 1702. However, if another set of viewpoint images is not to be created based on the decision in operation 1710 the method 1700 proceeds to an end state 1712 and terminates.

Figure 22A:
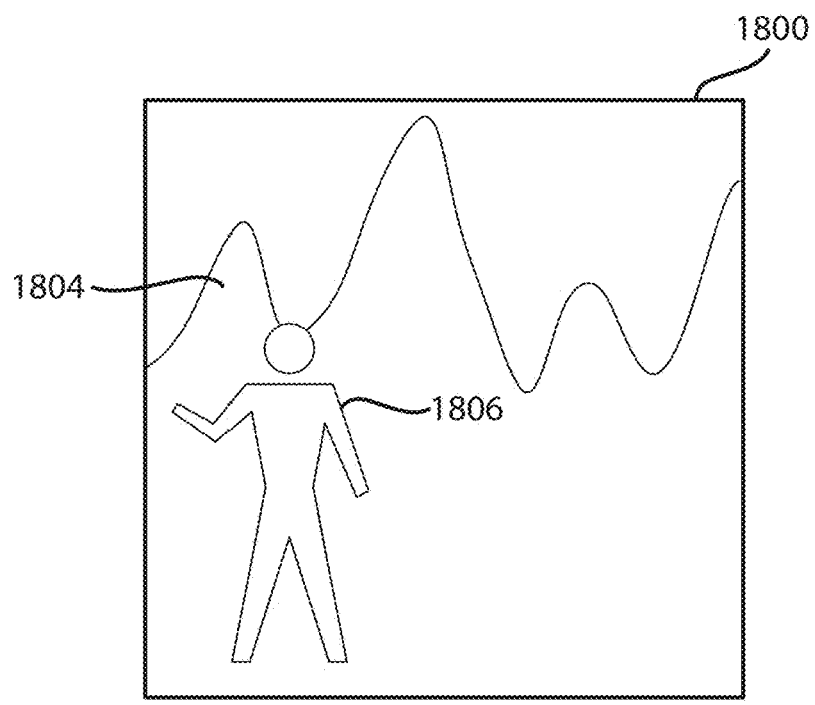
FIG. 22A is a first image taken from a first viewpoint of a frame.

Examples of images created using the method 1700 of FIG. 21 are shown in FIGS. 22A-23D. FIG. 22A illustrates a first image 1800 taken from a first viewpoint, and FIG. 22B illustrates a second image 1802 of the same scene taken from a second viewpoint. Using the method 1700, the computing device interpolates a corresponding left eye image and right eye image (not shown) to create the first image 1800 at a first viewpoint and the second image 1802 at a second viewpoint. The two images 1800, 1802 illustrate the same frame or scene, but from different viewpoints. For example, turning first to FIG. 22A, the image 1800 includes a first object 1806 positioned against a background 1804. The first image 1800 is taken from a first viewpoint approximately aligned with a front side of the object 1806. With reference now to FIG. 22B, the second image 1802 is taken from a viewpoint offset from the front of the first object 1806, e.g., to a right side of the object 1806.

In this image 1802, different features of the object 1806 may be visible as the viewer is viewing the object 1806 from a different location. As the left and right eye images 1640, 1642 and the pixel offset include not only layer information but also volume information for the object 1806, the viewer views new features and receives new information in the second image 1802 due to the new viewpoint. For example, as the viewpoint changes and a new image at a particular viewpoint is created, the viewer may receive new data similar to a viewer walking around a 3-D object. Continuing with this example, as the user walks around a 3-D object, the viewer continues to view the object, but as the viewpoint changes, the features visible to the user, as well as the angle of previously visible features, change. These changes provide the viewer with additional information about the object. Similarly, because the first image 1800 and the second image 1802 are rendered from different viewpoints, the viewer receives different information about the object 1806, the background 1804, etc., by viewing the first image 1800 and the second image 1802. For example, as the viewpoint changes from the first viewpoint to the second viewpoint, the viewer of the second image 1802 views a second object 1808 that is not visible from the first viewpoint.

Figure 22B:
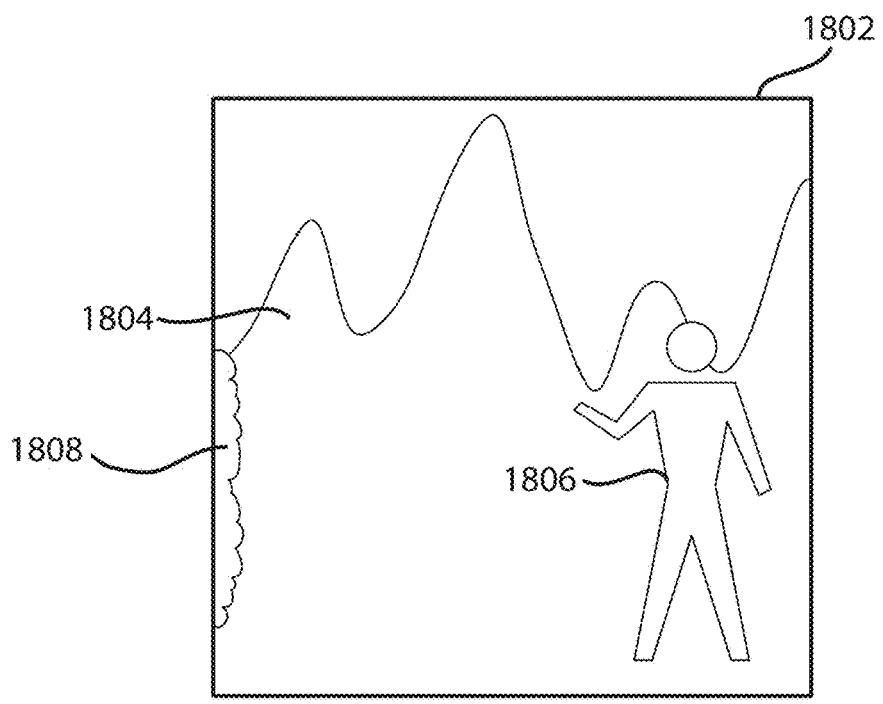
FIG. 22B illustrates a second image taken from a second viewpoint of the same frame as the image of FIG. 22A.

With reference to FIGS. 22A and 22B, the foreground object 1806 shifts to the right of the frame between images 1800, 1802 based on the viewpoint location shifting towards a left-side of the frame. For example, as the camera shifts towards the frame left, the newly visible features may be visible on the left side of the frame.

The image pairs created and used with the method 1700 include depth information for not only the layer of each object 1806 and the background 1804, but also volume information for portions of each object 1806. This allows the first and second images 1800, 1802 to provide different information to the viewer than the original stereo pairs. In particular, the volume information, such as the warping that is induced in the object, allows some pixels of an object within a frame to appear closer to the viewer and other pixels to appear farther away from the viewer and due to the offset of the object within the frame itself, provides the viewer with a more natural depth appearance that combines the depth of the object within the frame, along with the volume appearance due to the warped shape of the 2-D object. With the images 1800, 1802 the volume data for the object 1806 provides the user with new information, such as the rounded interior portions of an object, and provides the user with an experience similar to walking around a 3-D object. As such, the viewpoint images provide a user with a more realistic 3-D depth illusion.

In addition to providing a new viewpoint for a single frame, the method 1700 may also be used to create animation or movement sequences that include a viewpoint change throughout the animation. These examples allow a viewer to experience walking within a scene while the scene is being acted out (e.g., animated), similar to an experience a person may have while walking on a movie set as the actors are filming. By creating images from different viewpoints during a series of frames, the viewer may be presented with additional information and a different perspective while experiencing the movement within the frame.

Figure 23A:
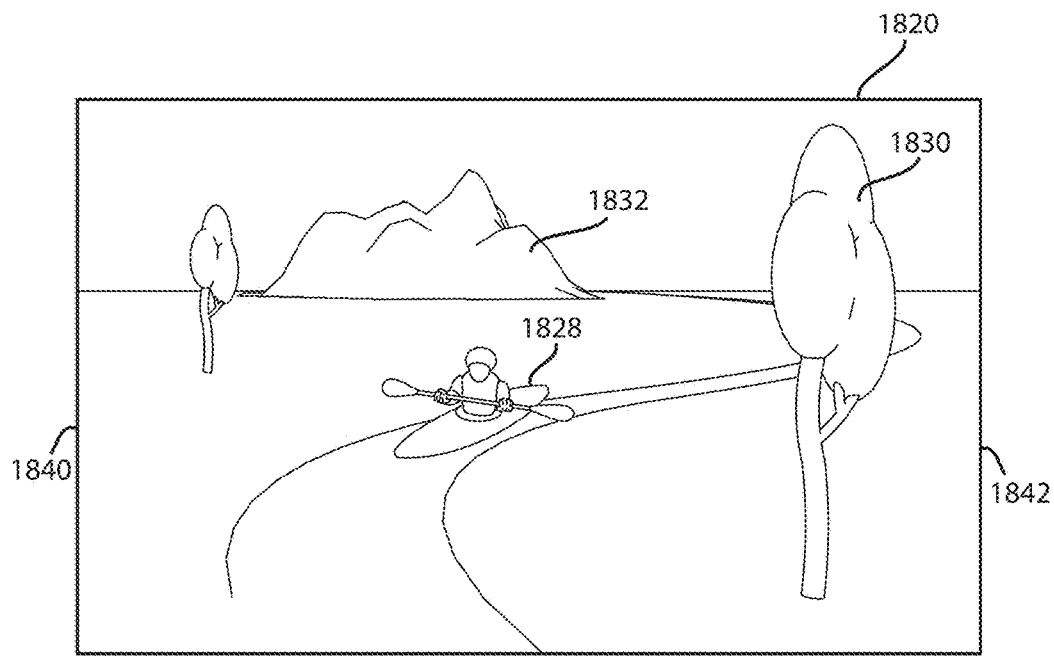
FIG. 23A is a first image of a first frame of an animation rendered from a first viewpoint.

FIGS. 23A-23D illustrate frames of an animation rendered for different viewpoints. It should be noted that the discussion of FIGS. 23A-23D is made with respect to an animation, but any type of content with features varying over time, such as a movie, may be created with the method 1700, and the animation sequence is meant as illustrative only. With reference to FIG. 23A, a first image 1820 is rendered for a first viewpoint and at a first point of time in the animation sequence. In this image 1820, the moving object 1828 (which may include one or more objects) is positioned at a first location relative to the background 1832. A second object 1830 is in the foreground. In this image 1820, the moving object 1828, the second object 1830, and the background 1832 may each be rendered based on the viewpoint and the specific time along the animation sequence. In this case, the moving object 1828 and the second object 1830 are positioned at first locations relative to the background 1832. In this discussion, the second object 1830 may be a non-moving object within the animation sequence, and the moving object 1828 may be a moving object within the same sequence. However, it should be noted that more than one object may be moving per sequence and/or that each object may be rendered not just based on viewpoint but also based on movement.

Figure 23B:
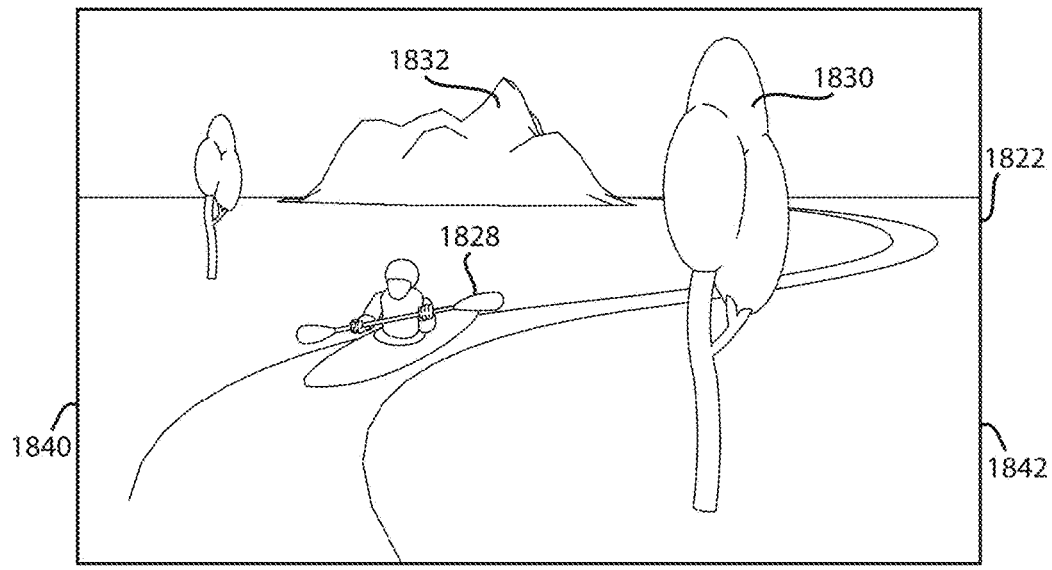
FIG. 23B is a second image of a second frame of the animation of FIG. 23A rendered from a second viewpoint.

With reference to FIG. 23B, a second image 1822 is rendered based on a second frame along the animation sequence and from a second viewpoint. In particular, the second viewpoint is moved closer towards a second side 1842 of the frame as compared to the viewpoint location in the first image 1820. Also, the moving object 1828 has moved to a different position and configuration. Due the change in the animation frame, as well as the changed viewpoint, the second image 1822 illustrates a different view of the moving object 1828, the second object 1830 (although it does not change in position in configuration due to the animation, but based on viewpoint alone). Also, because the viewpoint and the animation sequence location have changed, the viewable portions of the background 1832 have changed as well.

Figure 23C:
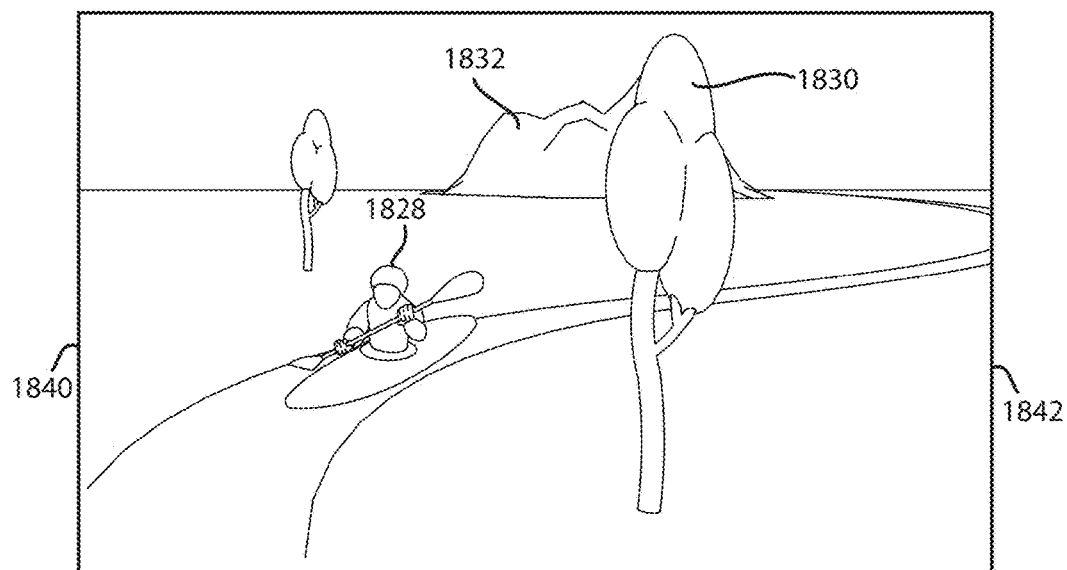
FIG. 23C is a third image of a third frame of the animation of FIG. 23A rendered from a third viewpoint.
Figure 23D:
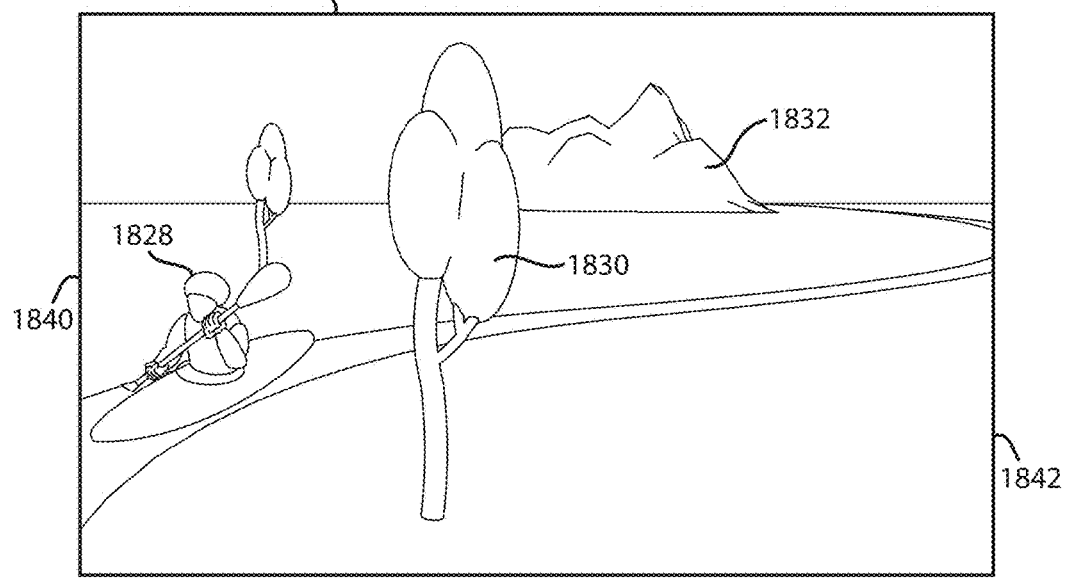
FIG. 23D is a forth image of a forth frame of the animation of FIG. 23A rendered from a forth viewpoint.

With reference to FIGS. 23C and 23D, as the animation sequence continues to move along in time, the third image 1824 and fourth images 1826 each illustrate a different position and configuration for the moving object 1828. Additionally, the third image 1824 and the fourth image 1826 are each rendered from viewpoints that are different from the second image 1822 and each other. In particular, the viewpoint in this example moves toward the second side 1842 of the frame and away from the first side 1840 of the frame. As the viewpoint changes, the appearance of the object 1830 changes as a viewer is viewing the second object 1830 from a new location. Similarly, although the moving object 1828 is moving relative to the background 1832 due to the animation, the viewer is also viewing the moving object 1828 from a different location than shown in the first image 1820 and the second image 1822. As described above with respect to FIGS. 22A and 22B, as the left and right stereo image pair data includes information about the depth of each object, as well as the volume, the user is presented with additional data about the objects as the viewpoint changes. This allows the user to experience not only the change in configuration and position of one or more objects based on the location of the frame within a sequence of an animation, but also based on the viewpoint of each image.

In the examples shown in FIGS. 23A-23D the viewpoint for each of the images 1820, 1822, 1824, 1826 changes along with the animation frame. In some embodiments, the changes in viewpoint may be correlated to the playback or animation frame such that as the viewpoint changes the animation of the moving object 1828 changes as well. In other embodiments, the viewpoint may be separate from the animation such that the animation may be independent of the viewpoint. The relationship between the viewpoint and the animation will be discussed in more detail below, but is used to render the images 1820, 1822, 1824, 1826 at the desired time.

The computing device 1604 may be configured to play the images 1820, 1822, 1824, 1826 in sequential order. As each of the images 1820, 1822, 1824, 1826 are captured from a new viewpoint, where the viewpoint changes progressively along a lateral axis of the frame, when the images are played sequentially, the images have a 3-D effect, although each image is displayed separately from the other images (e.g., images are not displayed in pairs simultaneously). The depth effect or depth illusion is due to viewpoints between the left and right eye parallax images being shown sequentially and progressively. Based on the speed of the playback, the user views the 3-D effect.

Using the images of FIGS. 22 and 23A-23D, the computing device 1602 can create an appearance of depth and volume for the objects in the images. In a first embodiment, the computing device 1602 may display a single image frame, but display images from multiple viewpoints. In this example, the user may not experience animation (e.g., the frame remains the same), but due to the sequential display of images from different viewpoints in that frame, the user experiences a depth illusion of one or more objects in the frame. In a second embodiment, the computing device 1602 may display an animated sequence where both the viewing location and the frame are varied. In this embodiment, the viewpoint may dictate the frame to be displayed, e.g., with a change in viewpoint, there may be a corresponding change in an animated sequence. In a third embodiment, the computing device 1602 may generate an entire animated sequence from a desired viewpoint. In this embodiment, the animated sequence may play back independently from the viewing location. Exemplary methods for implementing the above embodiment examples will now be discussed in more detail. It should be noted that although the term animation sequence and/or frame sequence is used it is meant to encompass any frame sequence where movement of at least one object is done through playback of the image sequence.

Figure 24:
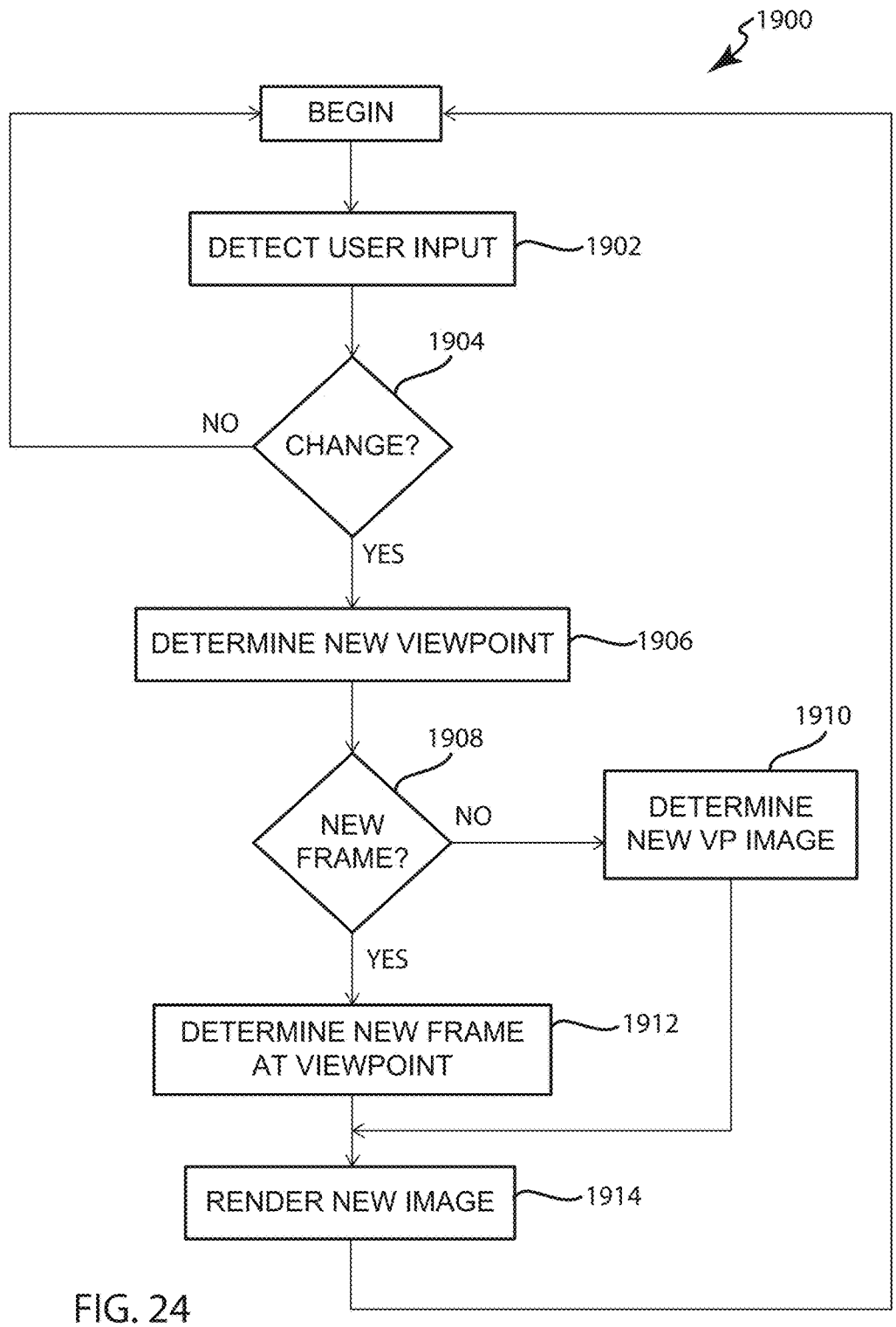
FIG. 24 is a flow chart illustrating a method for displaying one or more viewpoint images based on a user input.

A first method for using the system 1600 of FIG. 16A for displaying the viewpoint images based on a user input will now be discussed. FIG. 24 is a flow chart illustrating a method for displaying one or more viewpoint images based on a user input. The method illustrated in FIG. 24 may be used in instances where content, such as an image or a sequence of images (e.g., animation) is being displayed by the display 1604. As the image or plurality of images are being displayed, the computing device may detect user input which may be used to vary the images being displayed and/or the sequence of the images.

With reference to FIG. 24, the method 1900 may begin with operation 1902. In operation 1902, the computing device 1602 detects a user input. The user input may be detected by the one or more sensors 1608, 1618, input through one or more of the I/O devices 1606, 1614, 1616, and/or through the display 1604. In a first example, the computing device 1602 may include an eye detection sensor or sensors, and the user input may be detected by tracking the movement of the user's eyes relative to the display 1604. As another option, the computing device 1602 may detect movement of the user's head relative to the display 1604 and use the head movement to determine the focal point of the user's eyes. In embodiments using head tracking, the computing device 1604 may more quickly estimate the user's focal location, but may not be as accurate as tracking movement of the user's eyes themselves.

In a second example, one or more movement sensors such as accelerometers or gyroscopes may be used to detect movement of the computing device 1604 or an accessory. In this example, as the user rocks the computing device 1604 side to side, rotates, tilts, or otherwise moves the computing device 1604, the sensors of the computing device can detect this input by the user.

In a third example, the user's position relative to the computing device 1602 and/or display 1604 may be used to determine the viewpoint. For example, in embodiments where the display 1604 is a movie theater or other large screen, a display at a theme park, or a stand-up monitor (e.g., standalone monitor), a camera or other sensor can detect the user's position relative to the display 1604. The viewpoint may then be selected based on the actual viewing location of the display 1604 by the user.

Other examples include detecting the input through one or more peripheral devices or accessories, e.g., the mouse 1616, keyboard 1614, or a stylus. It should be noted that the user input may be a direct action by the user (e.g., swiping a finger along the display, pressing a button, etc.) and/or may be an indirect action by the user (e.g., watching the display and moving his or her eyes along with the character). In some instances, the user input may be correlated to location of the viewpoint. For example, if the user presses the display 1604 to enter an input (e.g., through a touch screen), the viewpoint may be the location of the user's touch. It should be noted that the examples of user input described herein are meant as illustrative only as there are many other types of detecting or receiving user input that are envisioned to be used with this system 1600.

With reference to FIG. 24, once the user input has been detected, the method 1900 transitions to operation 1904. In operation 1904, the processing element 1620 determines whether there has been a change in the user input. For example, in embodiments where the computing device 1602 includes an eye or head tracking sensor, the sensor may continue to detect the user input (e.g., the focal point of the user), but the user input may not have changed from the previously detected user input. In another example, the presence of a user input may indicate a change. For example, input of a user to the display 1604, such as on a select icon, or a user movement of the computing device 1602 may be detected as a user input and as a change in the user input. In this case, the change may be analyzed as a change in received user input. Alternatively or additionally, the change to the user input may be analyzed over a predetermined time period, e.g., has the user's focal point changed on average over the last 2 seconds.

In instances where the user input has not changed, the method 1900 may return to operation 1902. However, in instances where the user input has changed from the previous input, the method 1900 may proceed to operation 1906.

In some embodiments, operation 1904 may be omitted, and the presence of a user input may be sufficient to proceed to operation 1906.

In operation 1906, the processing element 1620 may determine a new viewpoint based on a user input. For example, the computing device 1602 may determine a new viewpoint based the user's actual view of the display 1604 (e.g., movement of the user across the screen correlates to a change in the image viewpoint). In another example, the processing element 1620 may correlate a user input to a viewpoint along the viewpoint spectrum 1646. In this example, a first user input may correlate to a first viewpoint at a first location along the viewpoint spectrum 1646, a second user input may correlate to a second viewpoint, and so on. In these embodiments, the characteristics of the user input may be used to determine the viewpoint, e.g., the speed, force, repetition, or the like of the user input may be correlated to assign a new viewpoint. In yet another example, the viewpoint may be unrelated to the user input except as an indicator to change the viewpoint, i.e., the viewpoint location may be predetermined and the user input may only be used to change between predetermined viewpoints. As one example, the viewpoints may be configured to change progressively, e.g., move left to right across the viewpoint spectrum 1646, and the user input indicates a change to the next viewpoint based on the progression.

Once the processing element 1620 has determined the new viewpoint, the method 1900 may proceed to operation 1908. In operation 1908, the processing element 1620 determines whether a new frame is desired. For example, the processing element 1620 analyzes whether the animation sequence has moved from a first frame to a second frame, in which case a new frame (the second frame) is required. To determine whether a new frame is required, the processing element 1620 may analyze the content to determine if the content includes a frame sequence or only a single frame (e.g., still image). If the content does include a plurality of frames, the processing element 1620 may further analyze whether the sequence has progressed to the next frame.

If the processing element 1620 determines in operation 1908 that a new frame is not required, the method 1900 may proceed to operation 1910 and the processing element 1620 determines the new viewpoint image. For example, the processing element 1620 determines which of the plurality of viewpoint images 1644a-1644n, 1646a-1646n to display, where the image detected in the new viewpoint may be of the same frame as currently being displayed, but from the new viewpoint.

In operation 1908, if the processing element 1620 determines that a new frame is required, the method 1900 proceeds to operation 1912. In operation 1912, the processing element determines the new frame at the new viewpoint. For example, the processing element determines which frame should be displayed along with which of the plurality of viewpoint images 1644a-1644n, 1646a-1646n should be displayed.

After either operation 1910 or operation 1912, the method 1900 proceeds to operation 1914. In operation 1914, the processing element 1620 renders the new image which includes a new viewpoint and optionally a new frame. It should be noted that rendering the image may include creating the image (e.g., using the method of FIG. 21) or may include retrieving the image from the memory component 1624. For example, in some embodiments, a plurality of images at different viewpoints for each frame of a content may be created using the method of FIG. 21 and may be accessed when desired to be displayed. In other embodiments, the images may be generated dynamically, e.g., as they are to be displayed. The type of rendering used may depend on the operational characteristics of the computing device 1602, the content, and/or other factors.

With reference again to FIG. 24, once the image has been rendered, the method 1900 may return to the beginning. However, in some embodiments, the method may terminate if and when requested by a user or at the end of the content.

Using the method 1900 illustrated FIG. 24, the computing device 1602 varies the images displayed on the display 1604 based on the user input to the device 1602. In many instances, the viewpoint displayed may be selected to allow the user to experience depth and volume of the objects within the content without requiring a 3-D display. This is because by changing the viewpoint of the images displayed, the user receives the additional information provided by the images. Additionally, depending on the speed that the images are displayed, such as when by translating between images rapidly, the user will experience a 3-D effect due to the changing viewpoints. This is especially visible in embodiments where the viewpoints translate progressively.

Figure 25:
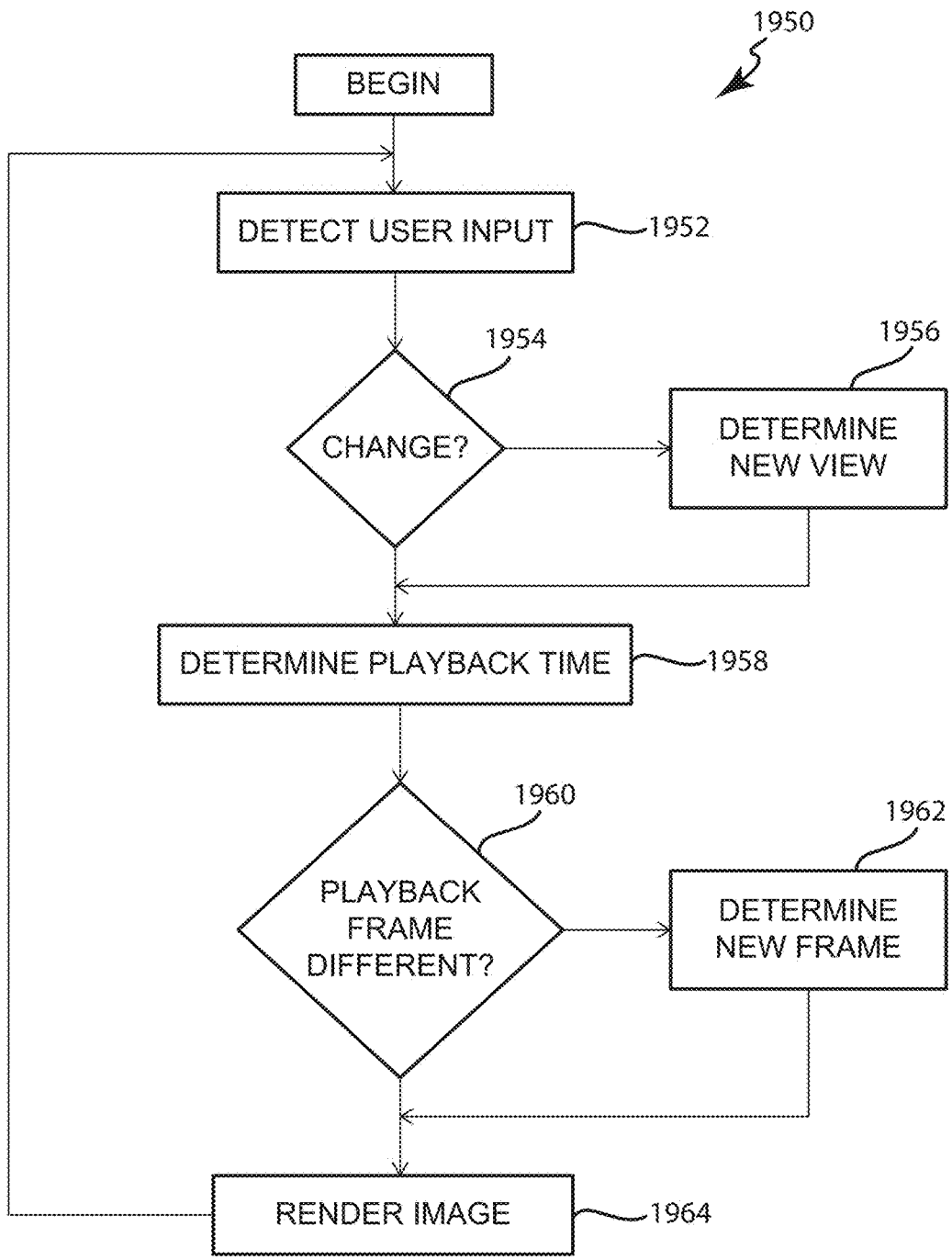
FIG. 25 is a flow chart for displaying a sequence of images based on the user input.

In other embodiments, the system 1600 may be used to vary a sequence of images based on the user input. In these embodiments, the animation sequence may be independent from the viewpoint, except in determining the initial viewpoint from which the sequence may be launched. FIG. 25 illustrates a flow chart for this method. Turning to FIG. 25, the method 1950 may begin with operation 1952. In operation 1952, the computing device 1602 detects a user input. This operation 1952 may be substantially the same as operation 1902 in FIG. 24.

Once a user input has been detected, the method 1950 may proceed to operation 1954. In operation 1954, the processing element 1620 may determine whether there has been a change in user input. This operation 1954 may be substantially the same as operation 1904 in FIG. 24. Additionally, as with operation 1904 in FIG. 24, this operation may be omitted and detection of a user input may function as a change to the user input. If the user input has changed, the method 1950 may proceed to operation 1956. In operation 1956, the processing element 1620 may determine the new viewpoint. Again, this operation 1956 may be substantially similar to operation 1906 in FIG. 24.

After operation 1956 or if in operation 1954 there was no change in user input, the method 1950 may proceed to operation 1958. In operation 1958, the processing element 1620 detects the playback time, i.e., the current location of the image sequence. As one example, the processing element 1620 may determine the current image being displayed on the display 1604 and determine where that image falls within the image sequence. As another example, the processing element 1620 may view the current time of the playback sequence. There are many other methods which could be used to determine the playback location of the image sequence at a particular time, and the above examples are meant as exemplary only.

With continued reference to FIG. 25, after operation 1958 and the playback time has been detected, the method 1950 may proceed to operation 1960. In operation 1960, the processing element 1620 determines whether the playback frame should be changed. For example, the processing element 1620 determines whether based on the current playback time whether a new frame in the frame sequence should be displayed or whether the current frame should remain being displayed. If a new frame should be displayed, the method 1950 may proceed to operation 1962 and the processing element 1620 determines the new frame. The processing element 1620 may analyze the image sequence to determine the new frame, i.e., which frame is to be displayed next based on the playback time.

If a new frame in the animation sequence is not going to be displayed or after the new frame has been determined in operation 1962, the method 1950 may proceed to operation 1964. In operation 1964 the processing element 1964 renders the new image. It should be noted that rendering may be either dynamically generating the new image, pulling the image from the memory component 1624, and/or a combination of generating the image and using stored portions of the image. After operation 1964, the method may return to operation 1952 and repeat.

In this example, the new image will include the new frame or the current frame, along with the viewpoint determined in operations, 1954, 1956. For example, for instances where a user input changes, the viewpoint of the image sequence to be displayed may change, but the frames of the image sequence may not change, except to be rendered from a different viewpoint. Thus, based on when the user input is detected or when the computing device 1604 searches for a user input, the image sequence may be changed to be rendered from the new viewpoint. In some instances, the computing device 1604 may change the viewpoint along the entire length of the image sequence, such as when as user provides input to the computing device 1604 at each frame. However, in other embodiments, the computing device may detect a user input at discrete intervals and the image sequence may play sequentially from the last determined viewpoint until the specified interval. This may allow the user to provide a first input regarding viewpoint and then play the image sequence.

However, in other examples, such as the method 1900 shown in FIG. 24, the image sequence may be varied based on viewpoint. For example, the frames that are played next may be varied to account not only for a change in viewpoint, but also a change in animation. Thus, using the method of FIG. 24, the user can provide input to change the viewpoint and the animation.

It should be noted that the techniques, system, and methods described herein may be used in a variety of different contexts to provide a user with a 3-D depth experience on a 2-D display. For example, the methods may be used in other instances where the illusion of depth on a 2-D plane may be desirable (e.g., theme parks, video games or the like). As such, the discussion of any particular embodiment is meant as exemplary only. Additionally, although the techniques, methods, and systems have been discussed with respect to rendering 2-D images to present an appearance of depth, in some embodiments, the techniques may be applied to 3-D images. In these instances, viewpoints for pairs of stereo images may be created and may be displayed offset to each other when the stereo images are displayed. This allows the viewpoint of a 3-D display (e.g., a stereo pair being displayed simultaneously) to vary based on a user input, animation sequence, or substantially any other factor.

Conclusion

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for creating multiple viewpoint images for an image frame comprising:
   receiving by a processing element a left eye image and a right eye image, wherein the left eye image and right eye image comprise a stereoscopic image pair;
   determining by the processing element a first viewing location corresponding to the left eye image and a second viewing location corresponding to the right eye image;
   determining by the processing element a plurality of exterior viewpoint locations outside of a range between the first viewing location and the second viewing location; and
   generating a plurality of exterior viewpoint images based on the exterior viewpoint locations and both the left eye image and the right image at the exterior viewpoint locations.

2. The method of claim 1, wherein each of the viewpoint images represent the image frame as viewed from the respective exterior viewpoint locations.

3. The method of claim 1, further comprising storing in a memory component the plurality of exterior viewpoint images.

4. The method of claim 3, further comprising selectively displaying one or more of the plurality of exterior viewpoint images on a display screen.

5. The method of claim 3, further comprising selectively transmitting one or more of the plurality of exterior viewpoint images to a computing device.

6. The method of claim 1, further comprising determining a plurality of interior viewpoint locations that are in a range between the first viewing location and the second viewing location.

* * * * *